(12) United States Patent
Hoshino

(10) Patent No.: US 7,222,594 B2
(45) Date of Patent: May 29, 2007

(54) CONTROL APPARATUS FOR AN INTERNAL COMBUSTION ENGINE

(75) Inventor: Keiji Hoshino, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/328,095

(22) Filed: Jan. 10, 2006

(65) Prior Publication Data

US 2006/0118071 A1 Jun. 8, 2006

Related U.S. Application Data

(62) Division of application No. 10/793,023, filed on Mar. 5, 2004, now Pat. No. 7,013,852.

(30) Foreign Application Priority Data

Mar. 6, 2003 (JP) .............................. 2003-060564
Dec. 10, 2003 (JP) .............................. 2003-412319

(51) Int. Cl.
*F01L 1/34* (2006.01)
(52) U.S. Cl. .............................. 123/90.15; 123/90.16; 123/346; 123/403
(58) Field of Classification Search ............. 123/90.15, 123/90.16, 90.17, 90.18, 90.27, 90.31, 345, 123/346, 347, 348, 403; 73/118.2
See application file for complete search history.

(56) References Cited

U.S. PATENT DOCUMENTS

| 5,347,962 A | * | 9/1994 | Nakamura et al. ....... 123/90.16 |
| 5,408,962 A | | 4/1995 | Tallio et al. |
| 5,967,114 A | | 10/1999 | Yasuoka |
| 6,276,334 B1 | | 8/2001 | Flynn et al. |
| 6,615,129 B2 | * | 9/2003 | Kabasin ...................... 701/110 |

FOREIGN PATENT DOCUMENTS

| JP | 2-221619 | 9/1990 |
| JP | 03003910 A | 1/1991 |
| JP | 5-1516 | 1/1993 |
| JP | 6-159027 | 6/1994 |

* cited by examiner

*Primary Examiner*—Ching Chang
(74) *Attorney, Agent, or Firm*—Nixon & Vanderhye P.C.

(57) ABSTRACT

A variable valve mechanism performs a valve lift switching operation for an intake valve. ECU defines valve lift switching characteristics corresponding to the engine operating region and executes the valve lift switching operation based on the switching characteristics. ECU calculates a parameter fluctuation amount of an engine occurring in response to the valve lift switching operation, and corrects the valve lift switching characteristics when the calculated parameter fluctuation amount exceeds a predetermined judgment value.

8 Claims, 17 Drawing Sheets

LOW-SPEED → HIGH-SPEED SWITCHING OPERATION

HIGH-SPEED → LOW-SPEED SWITCHING OPERATION

| PARAMETER FLUCTUATION AMOUNT ($\Delta\lambda$ [%]) | | RICH | | 0 | | LEAN | |
|---|---|---|---|---|---|---|---|
| | -3 | -2 | -1 | 0 | 1 | 2 | 3 |
| CORRECTION AMOUNT (ROTATIONAL SPEED[rpm]) | 300 | 200 | 100 | 0 | -100 | -200 | -300 |

FIG. 18

| TORQUE DEVIATION △T (Nm) | ... | −3 | −2 | −1 | 0 | 1 | 2 | 3 | ... |
|---|---|---|---|---|---|---|---|---|---|
| SWITCHING ROTATIONAL SPEED CORRECTION AMOUNT (rpm) | ... | 150 | 100 | 50 | 0 | −50 | −100 | −150 | ... |

FIG. 20

LOW-LIFT MODE SWITCHING OPERATION

| TORQUE DEVIATION ΔT | ADP1 | ADP2 | ADP3 | ADP4 | ADP5 | ... |
|---|---|---|---|---|---|---|
| IGNITION TIMING CORRECTION AMOUNT SALo | SALo1 | SALo2 | SALo3 | SALo4 | SALo5 | ... |
| VALVE TIMING CORRECTION AMOUNT VTLo | VTLo1 | VTLo2 | VTLo3 | VTLo4 | VTLo5 | ... |
| THROTTLE OPENING DEGREE CORRECTION AMOUNT THLo | VTLo1 | VTLo2 | VTLo3 | VTLo4 | VTLo5 | ... |

FIG. 21

HIGH-LIFT MODE SWITCHING OPERATION

| TORQUE DEVIATION ΔT | ADP1 | ADP2 | ADP3 | ADP4 | ADP5 | ... |
|---|---|---|---|---|---|---|
| IGNITION TIMING CORRECTION AMOUNT SAHi | SAHi1 | SAHi2 | SAHi3 | SAHi4 | SAHi5 | ... |
| VALVE TIMING CORRECTION AMOUNT VTHi | VTHi1 | VTHi2 | VTHi3 | VTHi4 | VTHi5 | ... |
| THROTTLE OPENING DEGREE CORRECTION AMOUNT THHi | VTHi1 | VTHi2 | VTHi3 | VTHi4 | VTHi5 | ... |

CONTROL APPARATUS FOR AN INTERNAL COMBUSTION ENGINE

RELATED APPLICATION

This is a division of parent application Ser. No. 10/793,023 filed Mar. 5, 2004 now U.S. Pat. No. 7,013,852, the priority of which is hereby claimed under 35 U.S.C. §120.

BACKGROUND OF THE INVENTION

This invention relates to a control apparatus for an internal combustion engine.

Recently, some types of internal combustion engines installed in automotive vehicles are equipped with a variable valve system which can variably control the lift amount, open/close turning, and other valve opening/closing action of intake valves and/or exhaust valves. The variable valve system variably controls these valve opening/closing action in accordance with a throttle opening degree and an engine speed or the like. More specifically, for example, the open/close lifting motion of the intake valve or the exhaust valve is selectively controlled by using a low-speed cam having a relatively small cam lift amount or a high-speed cam having a relatively large cam lift amount. To this end, a cam shaft is provided with the low-speed cam and the high-speed cam for controlling the valve opening/closing action. In this case, the engine operating region is separated beforehand into a working region of the low-speed cam and a working region of the high-speed cam. An appropriate cam is selected with reference to momentary values of the throttle opening degree and the engine speed.

Japanese Patent No. 2827768 discloses a variable valve system capable of selectively switching between a fuel economy-oriented valve operation mode and a power generation-oriented valve operation mode with reference to the engine operating region. The switching from the power generation-oriented valve operation mode to the fuel economy-oriented valve operation mode is executed at a specific throttle opening degree where no torque shock (i.e. no change in output torque) is caused in response to the switching operation. On the other hand, the switching from the fuel economy-oriented valve operation mode to the power generation-oriented valve operation mode is executed together with torque down correction including appropriate reduction of the throttle opening degree. With this control, it becomes possible to suppress or eliminate the torque shock occurring in the switching of valve operation mode.

However, according to the variable valve systems or various intake arrangements, the individual differences and aging changes of respective engines cause large difference and change in the charging efficiency. The engine control technique disclosed in the above-described prior art document gives no consideration on the individual differences and aging changes of respective engines. Therefore, due to the influence of such individual differences and aging changes, this conventional engine control technique is subjected to unpredicted control errors and accordingly cannot obtain desirable effects. Namely, unpredicted torque shock and air-fuel ratio fluctuation will occur. Accordingly, the drivability and the exhaust emission will be worsened.

SUMMARY OF THE INVENTION

In view of the above-described problems, the present invention has an object to provide a control apparatus for an internal combustion engine which is capable of properly performing the condition switching of an operating condition changing system, such as a variable valve device, and also capable of adequately maintaining the operating condition of the internal combustion engine.

In order to accomplish the above and other related objects, the present invention a first control apparatus for an internal combustion engine which is equipped with an operating condition changing system changing an operating condition of an internal combustion engine at least between two switchable conditions and switches the condition of the operating condition changing system in accordance with a momentary engine operating region.

For example, the operating condition changing system of the present invention includes a variable valve mechanism which changes the opening/closing action (e.g., a valve lift amount and a working angle) of at least one of an intake valve and an exhaust valve and controls a charging efficiency of intake air introduced into a combustion chamber. For example, the operating condition changing system of the present invention is a variable intake system which changes an air intake arrangement for introducing air into a combustion chamber. For example, the operating condition changing system of the present invention is a compression ratio changing system which changes a volume of a combustion chamber at a top dead center or a bottom dead center of a piston of the internal combustion engine so as to adequately change the compression ratio.

Furthermore, the operating condition changing system of the present invention is any other device which is capable of changing the operating condition of the internal combustion engine. As a practical example, the variable intake system is an intake pipe length changing system which is capable of changing the length of an intake pipe or an intake air stream generating system which has a modified intake passage for generating tumble flow or swirl flow when the intake air is introduced into a combustion chamber.

According to the present invention, the first control apparatus for an internal combustion engine includes switching control means which defines predetermined condition switching characteristics corresponding to respective operating regions of the internal combustion engine for performing condition switching of the operating condition changing system based on the condition switching characteristics; parameter fluctuation amount calculating means for calculating a parameter fluctuation amount of the internal combustion engine occurring in response to the condition switching performed by the operating condition changing system; and characteristics correcting means for correcting the condition switching characteristics when the calculated parameter fluctuation amount exceeds a predetermined judgment value.

More specifically, the switching of the operating condition changing system is controlled based on the predetermined condition switching characteristics. However, this switching tends to cause a variation in the behavior of the internal combustion engine, and accordingly unpredicted torque shock or air-fuel ratio fluctuation may occur. One of the factors causing such problems is individual differences and aging changes or respective engines. To solve this problem, the first control apparatus for an internal combustion engine of the present invention calculates the parameter fluctuation amount of the internal combustion engine occurring in response to the condition switching performed by the operating condition changing system and corrects the condition switching characteristics when the calculated parameter fluctuation amount exceeds a predetermined judgment value.

Accordingly, it becomes possible to eliminate control errors even when there are individual differences and aging chances in respective engines. The behavior of the internal combustion engine becomes stable. It becomes possible to prevent the drivability from being worsened due to torque shock and also becomes possible to prevent the exhaust emission from being worsened due to fluctuation of air-fuel ratio. Accordingly, it becomes possible to adequately perform the condition switching of the operating condition changing system. In other words, it becomes possible to adequately maintain the operating condition of the internal combustion engine.

According to a preferable embodiment of the present invention, the characteristics correcting means calculates a correction amount of the condition switching characteristics and stores calculated correction amount data in a backup memory, and renews the stored data with newly calculated correction amount data each time in succeeding correction amount calculations.

With this arrangement, the condition switching characteristics can be optimized by renewing the correction amount data. Thus, it becomes possible to continuously execute the optimized switching control for the operating condition changing system.

According to a preferable embodiment of the present invention, the condition switching characteristics are defined beforehand as causing no behavior change in the internal combustion engine in response to condition switching of the operating condition changing system.

With this arrangement, even when no correction for the condition switching characteristics is performed, it becomes possible to prevent the drivability from being worsened due to torque shock and also becomes possible to prevent the exhaust emission from being worsened due to fluctuation of air-fuel ratio.

According to a preferable embodiment of the present invention, the parameter fluctuation amount calculating means calculates the parameter fluctuation amount based on a difference appearing before and after the condition switching of the operating condition changing system.

With this arrangement, it becomes possible to successively obtain the unpredicted behavior change of an internal combustion engine.

The behavior change of an internal combustion engine appears in the air-fuel ratio fluctuation of a gas mixture or in the charging efficiency fluctuation of the gas mixture introduced into a combustion chamber.

Hence, it is preferable that the parameter fluctuation amount calculating means uses at least one of the air-fuel ratio fluctuation amount of a gas mixture and a charging efficiency fluctuation amount of the gas mixture introduced into a combustion chamber as the parameter fluctuation amount.

Furthermore, the operating condition changing system can be constituted as a stepwise changing system whose condition switching is stepwise or as a linear changing system whose condition switching is linear. In the case of applying this invention to the stepwise changing system, it is preferable that the parameter fluctuation amount calculating means calculates the parameter fluctuation amount and the characteristics correcting means performs characteristics correction when the condition of the operating condition changing system is switched in a stepwise manner. On the other hand, in the case of applying this invention to the linear changing system, it is preferable that the parameter fluctuation amount calculating means calculates the parameter fluctuation amount and the characteristics correcting means performs characteristics correction when the condition of the operating condition changing system is switched by an amount exceeding a predetermined width at a time.

The present invention provides a second control apparatus for an internal combustion engine equipped with a variable valve lifting device which switches lift characteristics of an intake valve and/or an exhaust valve of an internal combustion engine, and selecting an optimum control mode for the variable valve lifting device in accordance with operating conditions of the internal combustion engine among a plurality of control modes being differentiated in the lift characteristics. The second control apparatus of this invention includes a torque calculating means, a torque learning means, and a control mode switching characteristics correcting means. The torque calculating means calculates an output torque of the internal combustion engine. The torque learning means learns a torque thereinafter, referred to as "pre-switching torque") calculated by the torque calculating means immediately before the control mode of the variable valve lifting device is switched, and also learns a torque (hereinafter referred to as "post-switching torque") calculated by the torque calculating means immediately after the control mode is switched. And, the control mode switching characteristics correcting means corrects switching characteristics of the control mode of the variable valve lifting device based on learning result of the torque learning means so as to reduce a difference between the pre-switching torque and the post-switching torque.

With this arrangement, it becomes possible to correct the operating conditions (e.g. rotational speed, load, etc.) where the control mode of the variable valve lifting device is switched. The change of output torque occurring before and after the control mode switching operation can be reduced (or eliminated) even when the torque characteristics in any control mode of the variable valve lifting device varies due to individual differences, aging changes, environmental changes etc. The torque change during the control mode switching operation of the variable valve lifting device can be reduced (or eliminated). Accordingly, it becomes possible to suppress the torque variation during the control mode switching operation of the variable valve lifting device without being adversely influenced by the change of torque characteristics caused due to individual differences, aging changes, environmental changes etc. Thus, the control mode switching for the variable valve lifting device can be smoothly performed without giving torque shock to a driver.

Furthermore, the present invention provides a third control apparatus for an internal combustion engine equipped with a variable valve lifting device which switches lift characteristics of an intake valve and/or an exhaust valve of an internal combustion engine, and selecting an optimum control mode for the variable valve lifting device in accordance with operating conditions of the internal combustion engine among a plurality of control modes being differentiated in the lift characteristics. The third control apparatus of the present invention includes a torque calculating means, a torque learning means, and specific control parameter correcting means. The torque calculating means calculates an output torque of the internal combustion engine. The torque learning means learns a torque (hereinafter, referred to as "pre-switching torque") calculated by the torque calculating means immediately before the control mode of the variable valve lifting device is switched, and also learns a torque (hereinafter referred to as "post-switching torque") calculated by the torque calculating means immediately after the control mode is switched. And, the specific control parameter correcting means corrects a specific control parameter at least in a selected control mode when the control mode of the variable valve lifting device is switched to the selected control mode, based on learning result of the torque learning means so as to reduce a difference between the pre-switching torque and the post-switching torque.

With this arrangement, it becomes possible to cancel the torque change occurring in the switching operation of the control mode of the variable valve lifting device with the torque change produced by the correction of the specific control parameter. Thus, the torque variation occurring during the control mode switching operation of the variable valve lifting device can be reduced (or eliminated).

The control parameters of the internal combustion engine include the information relating to the output torque (e.g. engine rotational speed, air-fuel ratio, intake air amount, intake pipe pressure, fuel injection amount). Accordingly, when the information related to the output torque is available, there is no necessity of calculating, actual output torque. Using such substitute information related to the output torque will bring similar effects.

Accordingly, the present invention provides a fourth control apparatus for an internal combustion engine equipped with a variable valve lifting device which switches lift characteristics of an intake valve and/or an exhaust valve of an internal combustion engine, and selecting an optimum control mode for the variable valve lifting device in accordance with operating conditions of the internal combustion engine among a plurality of control modes being differentiated in the lift characteristics. The fourth control apparatus of the present invention includes a torque information detecting means, a torque information learning means, and a specific control parameter correcting means. The torque information detecting means detects information (hereinafter referred to as "torque information") relating to an output torque of the internal combustion engine. The torque information learning means learns torque information (hereinafter referred to as "pre-switching torque information") detected by the torque information detecting means immediately before the control mode of the variable valve lifting device is switched, and also learns torque information (hereinafter referred to as "post-switching torque information") detected by the torque information detecting means immediately after the control mode is switched. And, the specific control parameter correcting means corrects a specific control parameter at least in a selected control mode when the control mode of the variable valve lifting device is switched to the selected control mode, based on learning result of the torque information learning means so as to reduce a difference between the pre-switching torque information and the post-switching torque information.

According to this arrangement, even in a case that there is no device for calculating the output torque of the internal combustion engine, it becomes possible to cancel the torque change occurring during the switching operation of the control mode of the variable valve lifting device with the torque change produced by the correction of the specific control parameter by using the information relating to the output torque (e.g. engine rotational speed, air-fuel ratio, intake air amount, intake pipe pressure, fuel injection amount). Thus, the torque variation occurring during the control mode switching operation of the variable valve lifting device can be reduced (or eliminated)

In this case, the specific control parameter to be corrected to suppress the torque deviation occurring before and after the control mode switching operation is for example ignition timing, valve timing, throttle opening degree or the like. It is usual that these control parameters are adjusted to appropriate values corresponding to the momentary operating conditions of the internal combustion engine. The correction amount may need to be increased to correct the specific control parameter to reduce the torque deviation occurring during the control mode switching operation. However, excessively enlarging the correction amount will give adverse influence to the operating conditions of the internal combustion engine.

In view of the above, it is preferable that the specific control parameter correcting means corrects at least two of the ignition timing, the valve timing, and the throttle opening degree as the specific control parameter. With this arrangement, it becomes possible to cancel the torque chance occurring during the switching operation of the control mode of the variable valve lifting device with a sum of at least two of the torque change amount produced by the correction of the ignition timing, the torque change amount produced by the correction of the valve timing, and the torque change amount produced by the correction of the throttle opening degree. Accordingly, it is unnecessary to excessively increase the correction amount of each specific control parameter. It becomes possible to arbitrarily determine the contribution rate of the correction amounts of respective specific control parameters. In other words, the setting of the correction amounts of respective specific control parameters is feasible without giving adversely influence to the operating conditions of the internal combustion engine.

Furthermore, the present invention provides a fifth control apparatus for an internal combustion engine equipped with a variable air intake device which switches intake passage conditions of an internal combustion engine, and selecting an optimum control mode for the variable air intake device in accordance with operating conditions of the internal combustion engine among a plurality of control modes being differentiated in the intake passage conditions. The fifth control apparatus of the present invention includes a torque calculating means, a torque learning means, and a control mode switching characteristics correcting means. The torque calculating means calculates an output torque of the internal combustion engine. The torque learning means learns a torque (hereinafter, referred to as "pre-switching torque") calculated by the torque calculating means immediately before the control mode of the variable air intake device is switched, and also learns a torque (hereinafter referred to as "post-switching torque") calculated by the torque calculating means immediately after the control mode is switched. And, the control mode switching characteristics correcting means corrects switching characteristics of the control mode of the variable air intake device based on learning result of the torque learning means so as to reduce a difference between the pre-switching torque and the post-switching torque.

Furthermore, the present invention provide a sixth control apparatus for an internal combustion engine equipped with a variable air intake device which switches intake passage conditions of an internal combustion engine, and selecting an optimum control mode for the variable air intake device in accordance with operating conditions of the internal combustion engine among a plurality of control modes being differentiated in the intake passage conditions. The sixth control apparatus of the present invention includes a torque calculating means, a torque learning means, and a specific control parameter correcting means. The torque calculating means calculates an output torque of the internal combustion engine. The torque learning means learns a torque (hereinafter, referred to as "pre-switching torque") calculated by the torque calculating means immediately before the control mode of the variable air intake device is switched, and also learns a torque (hereinafter referred to as "post-switching torque") calculated by the torque calculating means immediately after the control mode is switched. And, the specific control parameter correcting means corrects a specific control parameter at least in a selected control mode when the control mode of the variable air intake device is switched to the selected control mode, based on learning result of the torque learning means so as to reduce a difference between the pre-switching torque and the post-switching torque.

Moreover, the present invention provides a seventh control apparatus for an internal combustion engine equipped with a variable air intake device which switches intake passage conditions of an internal combustion engine, and selecting an optimum control mode for the variable air intake device in accordance with operating conditions of the internal combustion engine among a plurality of control modes being differentiated in the intake passage conditions. The seventh control apparatus of the present invention includes a torque information detecting means, a torque information learning means, and a specific control parameter correcting means. The torque information detecting means detects information (hereinafter referred to as "torque information") relating to an output torque of the internal combustion engine. The torque information learning means learns torque information (hereinafter referred to as "pre-switching torque information") detected by the torque information detecting means immediately before the control mode of the variable air intake device is switched, and also learns torque information (hereinafter referred to as "post-switching torque information") detected by the torque information detecting means immediately after the control mode is switched. And, the specific control parameter correcting means corrects a specific control parameter at least in a selected control mode when the control mode of the air intake device is switched to the selected control mode, based on learning result of the torque information learning means so as to reduce a difference between the pre-switching torque information and the post-switching torque information.

Preferably, the specific control parameter correcting means corrects ignition timing, valve timing, and a throttle opening degree as the specific control parameter.

BRIEF DESCRIPTION OF THE DRAWINGS

The above and other objects, features and advantages of the present invention will become more apparent from the following detailed description which is to be read in conjunction with the accompanying drawings, in which:

FIG. 18 is a table showing an example of the switching rotational speed correction amount in accordance with the second embodiment of the present this invention;

FIG. 20 is a table showing an example of the ignition timing correction amount, the valve timing correction amount, and the throttle opening degree correction amount in a low-lift mode switching operation in accordance with the third embodiment of the present this invention;

FIG. 21 is a table showing an example of the ignition timing correction amount, the valve timing correction amount, and the throttle opening degree correction amount in a high-lift mode switching operation in accordance with the third embodiment of the present this invention.

DESCRIPTION OF THE PREFERRED EMBODIMENTS

Preferred embodiments of the present invention will be explained hereinafter with reference to attached drawings.

First Embodiment

Figure 1:
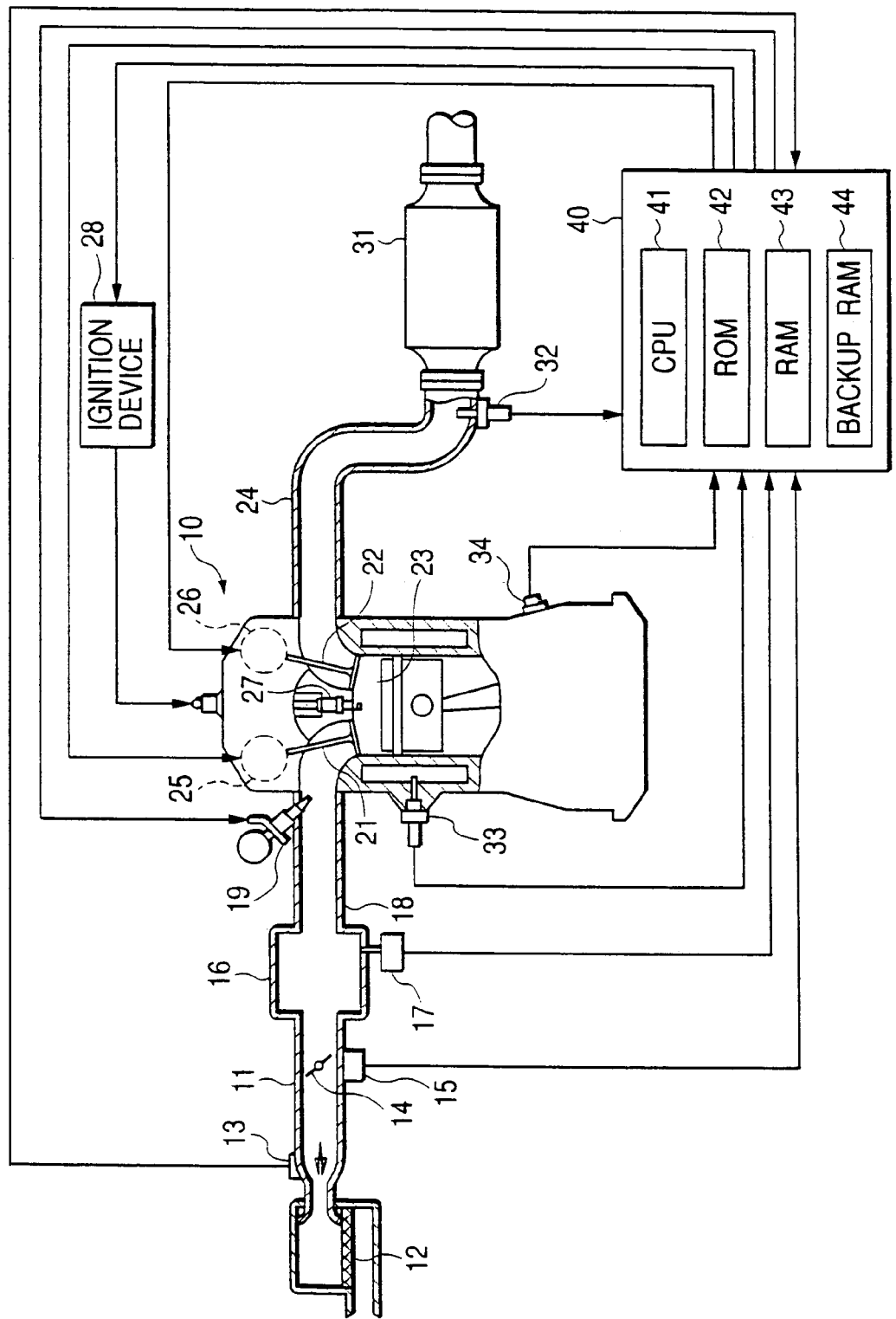
FIG. 1 is a schematic diagram showing the overall arrangement of an engine control system in accordance with a first embodiment of the present invention.

A preferred embodiment of the present invention will be explained hereinafter with reference to attached drawings. This embodiment relates to an engine control system based on a multi-cylinder gasoline engine which is one of representative internal combustion engines. This control system, including an electronic control unit (hereinafter referred to as ECU), executes the fuel injection amount control as well as the ignition timing control. Furthermore, according to this embodiment, the operating condition changing system is a variable valve mechanism which is capable of changing the opening/closing action of at least one of an intake valve or an exhaust valve. The variable valve mechanism of this embodiment controls the charging efficiency of intake air introduced into a combustion chamber. FIG. 1 is a schematic view showing an overall arrangement of the engine control system of this embodiment.

As shown in FIG. 1, an engine 10 includes an intake pipe 11 having an air cleaner 12 provided at the upstream end and an air flow meter 13 provided at a downstream side of this air cleaner 12 for detecting an intake air amount. Furthermore, the engine 10 includes a throttle valve 14 whose opening degree is adjusted by a DC motor or a comparable actuator and a throttle opening degree sensor 15 which detects a throttle opening degree which are both provided at a downstream side of the air flow meter 13. Furthermore, the engine 10 includes a surge tank 16 provided at a downstream side of the throttle valve 14. The surge tank 16 is equipped with an intake pipe pressure sensor 17 for detecting an intake pipe pressure. The surge tank 16 is integrally connected to an intake manifold 18 which introduces intake air into each cylinder of the engine 10. In each intake manifold 18, an electromagnetically driven fuel injection valve 19 is provided adjacent to an intake port of each cylinder. The fuel injection valve 19 injects fuel into the corresponding cylinder via the intake port.

An intake valve 21 opens and closes the intake port, while an exhaust valve 22 opens or closes an exhaust port of the engine 10. In synchronism with the opening action of the intake valve 21, a gas mixture of air and fuel is introduced into a combustion chamber 23. In synchronism with the opening action of the exhaust valve 22, the exhaust gas resulting from combustion is discharged into an exhaust pipe 24. A variable valve mechanism 25 is associated with the intake valve 21, and a variable valve mechanism 26 is associated with the exhaust valve 22. These variable valve mechanisms 25 and 26 have the structure for variably controlling the valve opening/closing action, such as a lift amount and a valve opening time (i.e. working angle), of respective valves 21 and 22 in a stepwise manner. Thus, the valve opening/closing action can be adequately adjusted in accordance with the momentary values of the throttle opening degree and the engine operating conditions. Details of the variable valve mechanisms 25 and 26 will be explained later.

The engine 10 has a cylinder head accommodating an ignition plug 27 provided so as to correspond to each cylinder. An ignition device 28, constituted by an ignition coil or the like, applies a high voltage to the ignition plus 27 at desired ignition timing. Each ignition plug 27 generates a spark discharge between opposing electrodes to ignite the gas mixture introduce in the combustion chamber 23.

The exhaust pipe 24 is equipped with a catalyst 31, such as a ternary catalyst, capable of purifying CO, HC, NOx or other harmful substances contained in the exhaust gas. An air-fuel ratio sensor 32 (e.g. a linear air-fuel ratio sensor, an oxygen sensor or the like), provided at the upstream side of this catalyst 31, detects an air-fuel ratio or rich/lean of the gas mixture through measurement of the exhaust gas. Furthermore, a cooling water temperature sensor 33, provided on the cylinder block of the engine 10, detects a cooling water temperature. A crank angle sensor 34, provided on the cylinder block of the engine 10, generates a rectangular crank angle signal in response to every advance of a predetermined crank angle (e.g., 30° CA) in the engine rotation.

ECU 40, serving as an engine controller, inputs the output signals of the above-described various sensors. ECU 40 includes a microcomputer which is chiefly composed of CPU 41, ROM 42, RAM 43, and backup RAM 44. ECU 40 executes various control programs stored in ROM 42 to control the fuel injection amount of fuel injection valve 19 and the ignition timing of ignition plug 27 in accordance with engine operating conditions. The backup RAM 44, functioning as a backup memory, receives electric power supplied from a backup power source to surely store memorized contents even after the ignition switch is turned off to stop supply of electric power to ECU 40. The data stored in the backup RAM 44 include learning values and diagnosis data. Alternatively, it is possible to store these learning values and diagnosis data into an EEPROM which has the capability of functioning as a backup memory.

Figure 2:
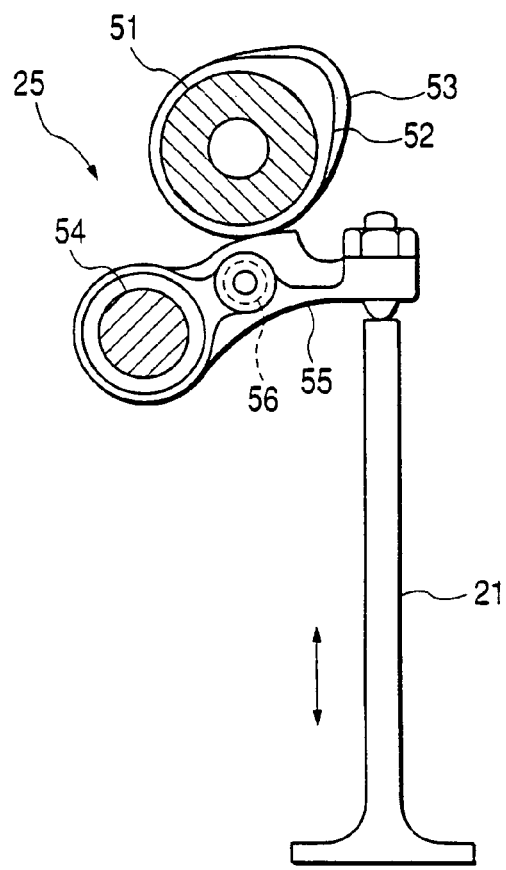
FIG. 2 is a diagram showing the arrangement of a variable valve mechanism in accordance with the first embodiment of the present invention.

FIG. 2 shows the detailed arrangement of the variable valve mechanism 25 located at the intake side. Although the variable valve mechanism 25 can be arranged arbitrarily, this embodiment employs a 2-stage switching arrangement which can selectively change the valve lift between a low-speed mode and a high-speed mode. The same arrangement can be employed for the other variable valve mechanism 26 located at the exhaust side. Therefore, the explanation for the variable valve mechanism 26 is omitted. The following explanation is given for the control of the variable valve mechanism 25 located at the intake side.

As shown in FIG. 2, a cam shaft 51 is provided with a low-speed cam 52 and a high-speed cam 53 which are mutually different in cam profile (i.e. lift curve). More specifically, the low-speed cam 52 has a relatively small lift curve to provide an optimized cam profile suitable for the low-speed operation of the engine. On the other hand, the high-speed cam 53 has a lift curve ranging in a wide angular region compared with that of the low-speed cam 52 to provide an optimized cam profile suitable for the high-speed operation of the engine. A rocker shaft 54, located under the cam shaft 51, extends in parallel with the cam shaft 51. A rocker arm 55, rotatably supported around the rocker shaft 54, swings about the axis of the rocker shaft 54. A distal end of the swingable rocker arm 55 contacts with the upper end of the intake valve 21 so that the intake valve 21 can cause an up-and-down lift action in synchronism with the swing motion of the rocker arm 55.

The rocker arm 55 consists of a low-speed rocker arm being slidably brought into contact with the low-speed cam 52 and a high-speed rocker arm being slidably brought into contact with the high-speed cam 52 which are provided next to each other (although not shown in the drawing). The intake valve 21 causes a lift action in accordance with the swing motion of either the low-speed rocker arm or the high-speed rocker arm. Namely, when the engine is in the low-speed operating condition, the intake valve 21 causes a lift action in accordance with the swing motion of the low-speed rocker arm driven by the low-speed cam 52, thereby realizing a relatively small valve lift curve. On the contrary, when the engine is in he high-speed operating condition, the intake valve 21 causes a lift action in accordance with the swing motion of the high-speed rocker arm driven by the high-speed cam 53, thereby realizing a relatively large valve lift curve. Selection between the low-speed rocker arm and the high-speed rocker arm is realized by selectively activating or deactivating the motion of the high-speed rocker arm, with a hydraulically driven connecting device 56 connecting both rocker arms.

Figure 3:
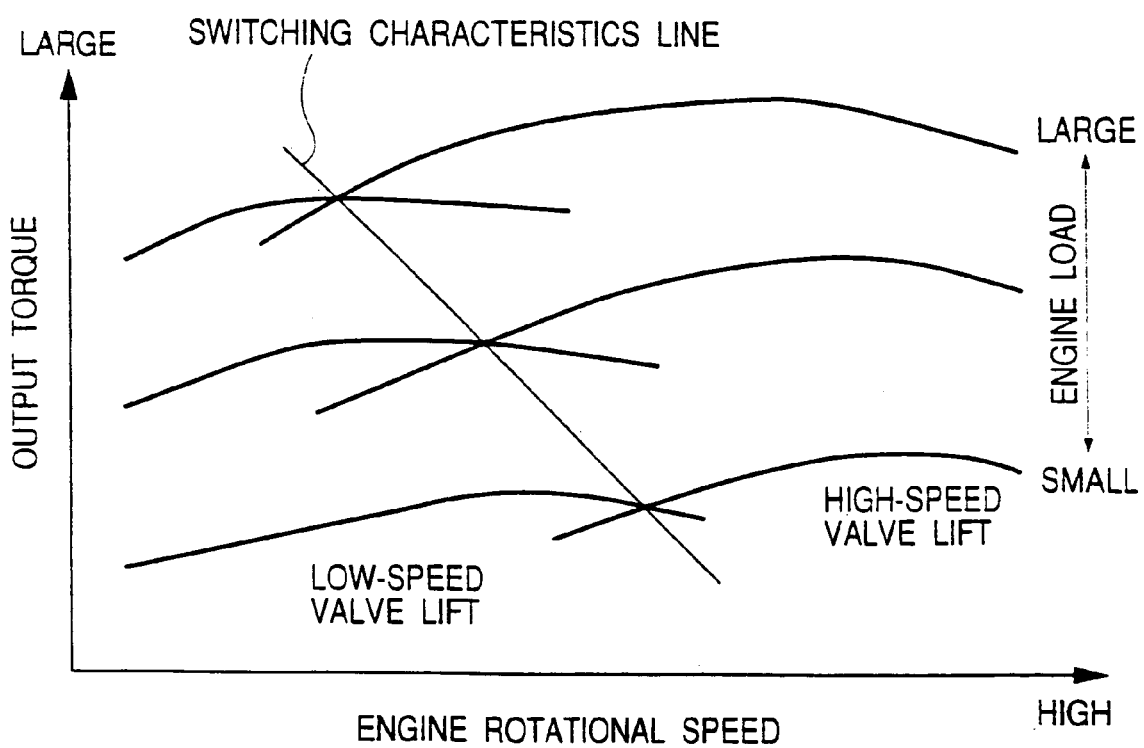
FIG. 3 is a graph showing the characteristics of a valve lift switching operation.

ECU 40 drives the variable valve mechanism 25 based on the engine operating conditions so as to select either the low-speed valve lift (i.e. the valve lift according to the low-speed cam 52) or the high-speed valve lift (i.e. the valve lift according to the high-speed cam 53). Namely, ECU 40 monitors the engine operating conditions momentarily and switches the valve lift amount and the valve opening time. More specifically, ECU 40 uses the engine characteristics shown in FIG. 3 to switch the low-speed valve lift and the high-speed valve lift with reference to parameters of the engine speed and the engine load (e.g. throttle opening degree). As shown in FIG. 3, this map defines a switching characteristics line (i.e. corresponding to condition switching characteristics) which connects specific engine operating points where no change of the output torque (i.e. no torque shock) occurs before and after the switching of the valve lift mode. Hence, the behavior change of the engine 10 remains unchanged as long as the engine operates on this switching characteristics line. Thus, ECU 40 executes the valve lift switching operation at the time the engine operating conditions just cross the switching characteristics line.

Figure 4A:
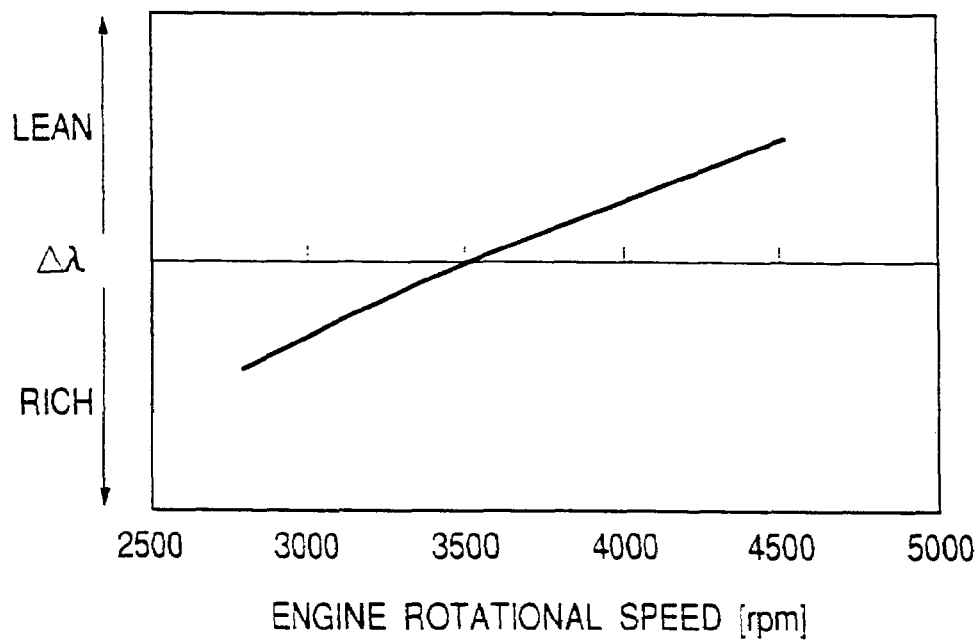
FIG. 4A is a graph explaining the behavior of an air-fuel ratio fluctuation amount during a valve lift switching operation.
Figure 4B:
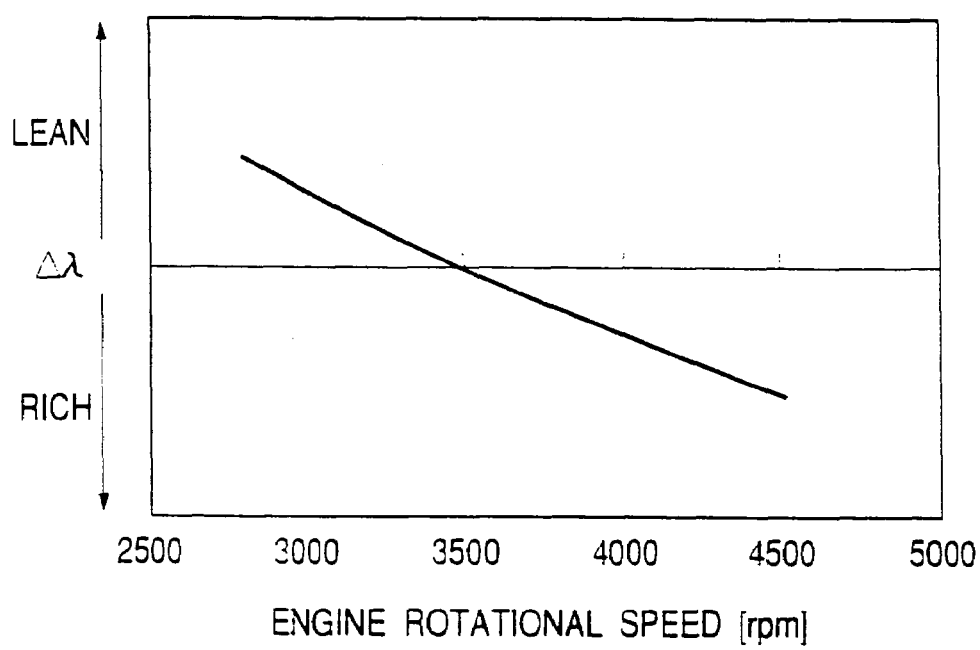
FIG. 4B is a graph explaining the behavior of an air-fuel ratio fluctuation amount during another valve lift switching operation.

FIGS. 4A and 4B are graphs each showing an air-fuel ratio fluctuation amount $\Delta\lambda$ (corresponding to the parameter fluctuation amount) occurring during the valve lift switching operation in relation to the engine speed. FIG. 4A shows the air-fuel ratio fluctuation amount $\Delta\lambda$ during the low-speed→high-speed switching operation. FIG. 4B shows the air-fuel ratio fluctuation amount $\Delta\lambda$ during the high-speed→low-speed switching operation. In this case, the engine load (e.g., throttle opening degree) is maintained at a constant value. According to FIGS. 4A and 4B, in each of the low-speed→high-speed switching operation and the high-speed→low-speed switching operation, the air-fuel ratio fluctuation amount $\Delta\lambda$ is minimized at the engine speed=approximately 3,500 rpm. According to the switching characteristics line shown in FIG. 3, the valve lift switching operation is executed at this switching point (e.g., engine speed=approximately 3,500 rpm) where the air-fuel ratio fluctuation amount $\Delta\lambda$ is minimized.

Figure 5:
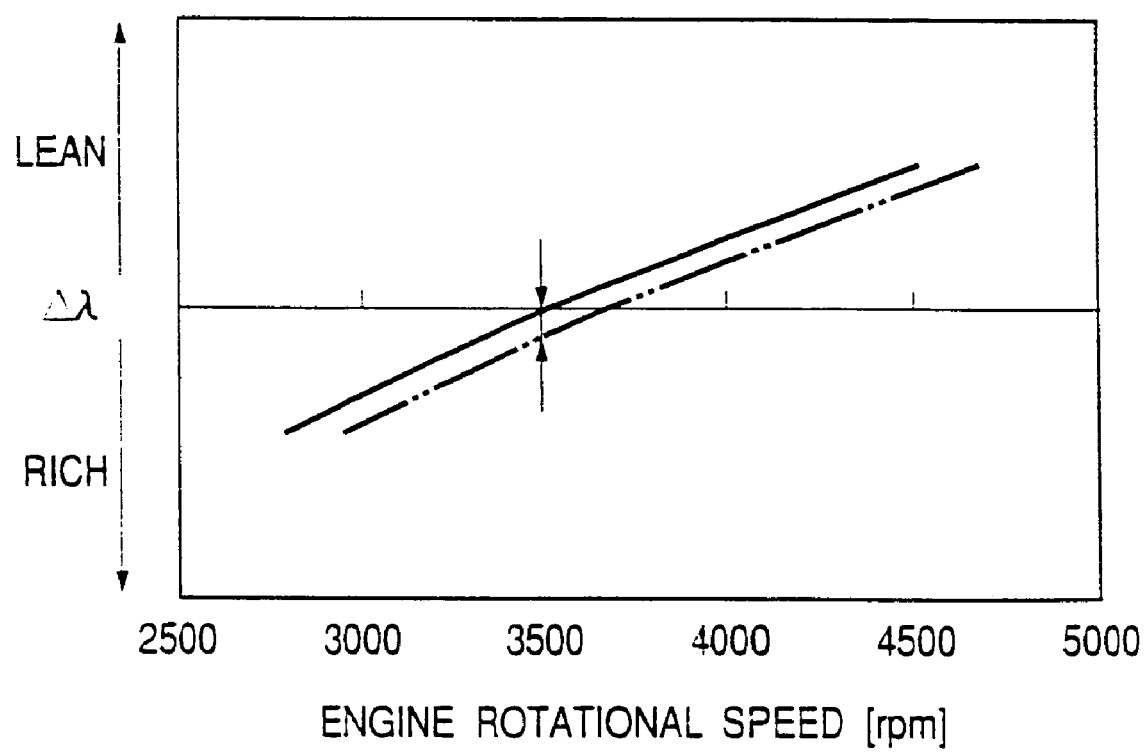
FIG. 5 is a graph explaining the behavior of an air-fuel ratio fluctuation amount during the valve lift switching operation.

As long as the valve lift switching operation is performed on the switching characteristics line, the behavior of the engine 10 does not change inherently. However, due to individual differences and aging changes of respective engines, there is the possibility that the behavior change of engine 10 may occur. In this case, the behavior change of engine 10 will induce unpredicted torque shock or air-fuel ratio fluctuation. For example, as shown in FIG. 5, the $\Delta\lambda$ behavior during the low-speed→high-speed switching operation may deviate from the solid line to the alternate long and two short dashes line due to individual differences and aging changes of respective engines. In such a case, if the valve lift switching operation is executed at the engine speed=approximately 3,500 rpm according to the switching characteristics line, a significant amount of air-fuel ratio fluctuation amount $\Delta\lambda$ will appear. The resultant air-fuel ratio fluctuation will worsen the exhaust emission and the accompanied torque shock will worsen the drivability.

Hence, this embodiment proposes performing the correction of the switching characteristics line based on the air-fuel ratio fluctuation amount $\Delta\lambda$ during the value lift switching operation. ECU 40 executes the control of the value lift switching operation, the calculation of the air-fuel ratio fluctuation amount $\Delta\lambda$, and the correction of the switching characteristics line. Namely, according to this embodiment, ECU 40 serves as the "switching control means", the "parameter fluctuation amount calculating means", and the "characteristics correcting means."

Next, the variable valve lift control performed by ECU 40 will be explained hereinafter.

Figure 6:
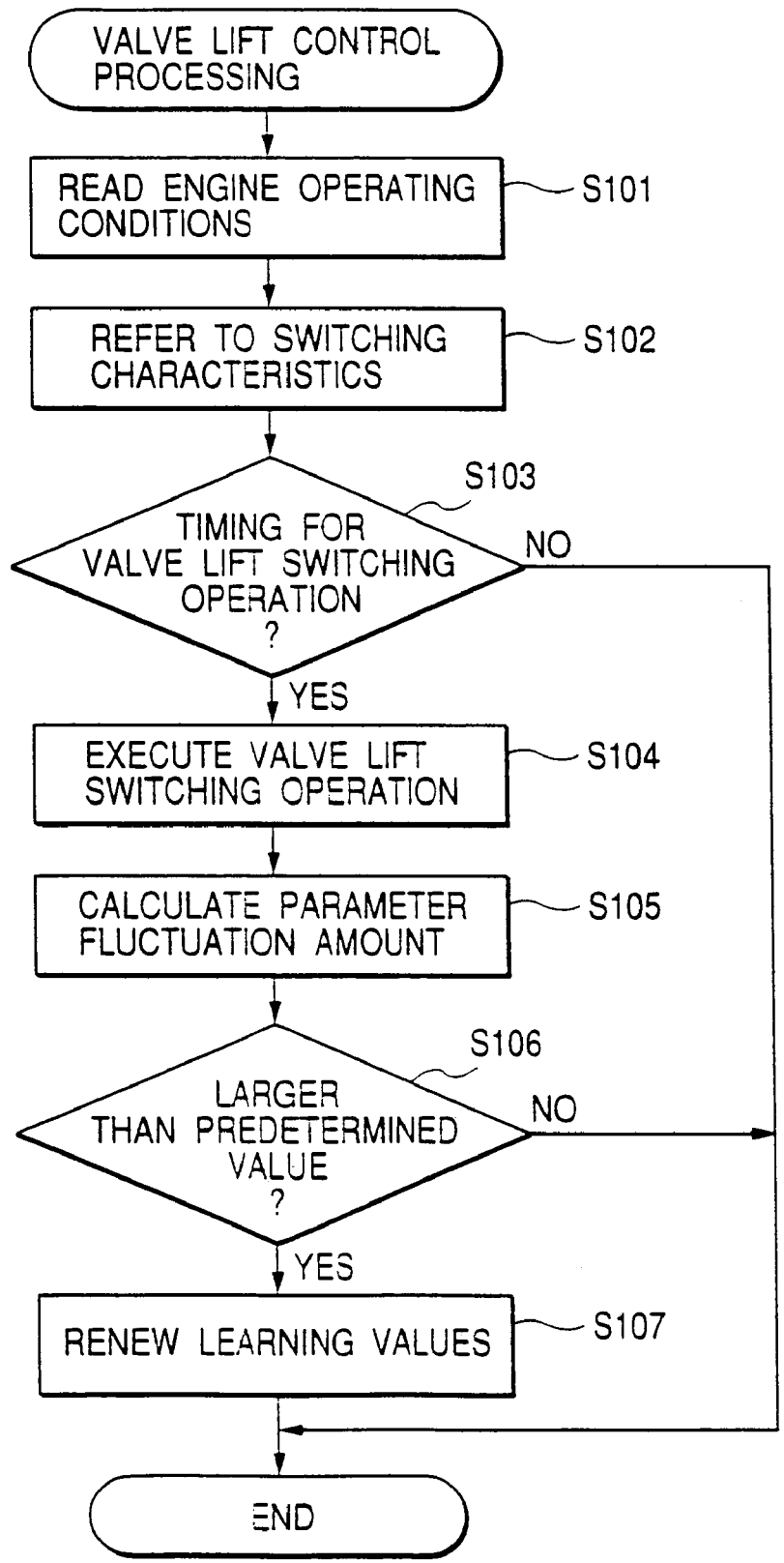
FIG. 6 is a flowchart showing the valve lift control processing in accordance with the first embodiment of the present invention.

FIG. 6 is a flowchart showing the valve lift control processing. CPU 41, incorporated in ECU 40, executes this processing periodically in response to every advance of a predetermined crank angle (e.g. 30° CA according to this embodiment).

According to the flowchart shown in FIG. 6, first in step S101, CPU 41 reads various parameters representing the engine operating conditions including the engine speed and the throttle opening degree. Then, in step S102, CPU 41 refers to the switching characteristics defined with the parameters of the engine speed and the throttle opening degree. More specifically, CPU 41 refers to a table data corresponding to the switching characteristics line shown in FIG. 3.

In the succeeding step S103, CPU 41 makes a judgment as to whether or not it is the time for the valve lift switching operation. When it is not the time for the valve lift switching operation (i.e. NO in step S103), CPU 41 terminates this processing. In the case that the backup RAM 44 stores the learning values (correction amount data) relating to the switching characteristics, CPU 41 performs the judgment for the valve lift switching operation based on these learning values in the steps S102 and S103.

Furthermore, when it is the time for the valve lift switching operation (i.e. YES in step S103), CPU 41 proceeds to step S104 to execute the valve lift switching operation. More specifically, CPU 41 outputs a control command to the variable valve mechanism 25 (or to the variable valve mechanism 26 located at the exhaust side). The variable valve mechanism 25 is driven in response to the control command so as to realize the switching from the valve lift operation using the low-speed cam 52 to the valve lift operation using the high-speed cam 53 or vice versa. Then, in step S105, CPU 41 calculates a parameter fluctuation amount appearing before and after the valve lift switching operation. More specifically, CPU 41 calculates an air-fuel ratio fluctuation amount $\Delta\lambda$ as the parameter fluctuation amount based on a difference between detection values of the air-fuel ratio sensor 32 obtained at a predetermined sampling interval. Alternatively, CPU 41 calculates an air-fuel ratio fluctuation amount $\Delta\lambda$ as the parameter fluctuation amount based on a difference between an air-fuel ratio value prior to the valve lift switching operation and a peak value of the air-fuel ratio change occurring in accordance with the valve lift switching operation.

Then, in step S106, CPU 41 compares the calculated parameter fluctuation amount (i.e. air-fuel ratio fluctuation amount $\Delta\lambda$) with a predetermined value. When the calculated parameter fluctuation amount is less than the predetermined value (i.e. NO in step S106), CPU 41 judges or decides that no correction for the switching characteristics is necessary. Hence, CPU 41 terminates this processing. On the other hand, when the calculated parameter fluctuation amount is larger than the predetermined value (i.e. YES in step S106), CPU 41 judges or decides that the switching characteristics need to be corrected and accordingly proceeds to step S107.

Next, in step S107, CPU 41 executes the renewal processing for the learning values of the switching characteristics based on the calculated parameter fluctuation amount (i.e. air-fuel ratio fluctuation amount $\Delta\lambda$). The learning value renewal processing is performed in the following manner.

Figures 7, 8:
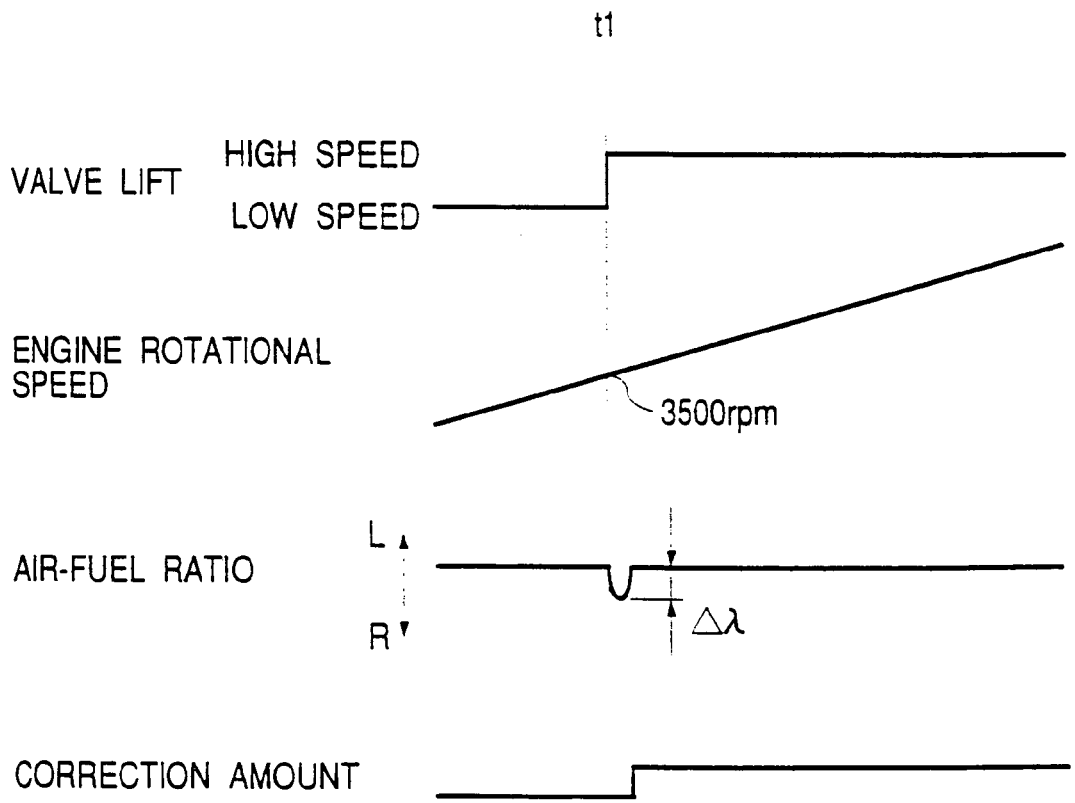
FIG. 7 is a diagram showing a practical example of a correction amount calculating table in accordance with the first embodiment of the present invention.
FIG. 8 is a timing chart explaining the correction amount calculating procedure in accordance with the first embodiment of the present invention.

CPU 41 refers to the table data shown in FIG. 7 being set so as to correspond to the parameter fluctuation amount (i.e. air-fuel ratio fluctuation amount $\Delta\lambda$), and calculates a correction amount in terms of the rotational speed in accordance with the momentary $\Delta\lambda$ value. In this case, CPU 41 obtains a positive correction amount when the $\Delta\lambda$ value is rich and obtains a negative correction amount when the $\Delta\lambda$ value is lean. In the case that the backup RAM 44 already stores a correction amount, CPU 41 reads this correction amount out of the backup RAM 44, and adds a present correction amount to the readout data to calculate a renewed correction amount. Then, CPU 41 stores the renewed correction amount as a learning value into the backup RAM 44.

For example, according to the example shown in FIG. 5, the air-fuel ratio deviates toward the rich side at the engine speed of approximately 3,500 rpm due to the valve lift switching operation. In this case, it is regarded that the optimum switching characteristics line is shifted toward the high rotation side. Hence, CPU 41 corrects the engine speed to the high rotation side as it is a decisive parameter of the switching characteristics. On the contrary, when the air-fuel ratio deviates toward the lean side, it is regarded that the optimum switching characteristics line is shifted toward the low rotation side. Thus, CPU 41 corrects the engine speed to the low rotation side.

Now referring to the timing chart shown in FIG. 8, the operation of this embodiment will be explained in more detail. At time t1, the engine speed just reaches a specified value (e.g., 3,500 rpm) on the switching characteristics line. ECU starts and completes the low-speed→high-speed valve lift switching operation. However, the air-fuel ratio may deviates toward the rich side due to individual differences and aging changes of respective engines. In such a case, ECU renews the correction amount (i.e., learning value) based on the air-fuel ratio fluctuation amount $\Delta\lambda$. The renewed correction amount (i.e., learning value) is used in the succeeding valve lift switching operation.

The above-described embodiment of this invention brings the following excellent effects.

The control apparatus for an internal combustion engine calculates the parameter fluctuation amount (i.e., air-fuel ratio fluctuation amount $\Delta\lambda$) occurring in response to the valve lift switching operation and corrects the switching characteristics when the calculated parameter fluctuation amount exceeds a predetermined judgment value. Accordingly, it becomes possible to eliminate control errors even when there are individual differences and aging changes in respective engines. The behavior of the engine becomes stable. It becomes possible to prevent the drivability from being worsened due to torque shock and also becomes possible to prevent the exhaust emission from being worsened due to fluctuation of air-fuel ratio. Accordingly, it becomes possible to adequately perform the value lift switching operation. In other words, it becomes possible to maintain the engine operating condition adequately.

The backup RAM 44 stores the correction amount data of the switching characteristics as learning values. The stored data are adequately used in the succeeding valve lift switching operation. Accordingly, it becomes possible to optimize the switching characteristics and continuously execute the optimized switching control.

This invention is not limited to the above-described embodiment and can be modified in the following manner.

In the valve lift control, it is possible to calculate a learning value (i.e. correction amount data) in each engine operating region and store the learning value into the backup RAM 44 in relation with the operating region. The renewal of the learning value can be done in each engine operating region. In this case, the characteristics correction is not performed differently in respective operating regions. Thus, the characteristics correction can be optimally performed in every engine operating region. Accurate valve lift control can be realized.

Instead of calculating the learning value (i.e. correction amount data) equivalent to the rotational speed, it is possible to calculate the learning value (i.e. correction amount data) equivalent to the engine load. Furthermore, it is possible to renew the switching characteristics instead of renewing the correction amount data by the learning processing.

Although the above-described embodiment monitors the engine behavior based on the air-fuel ratio fluctuation amount serving as the parameter fluctuation amount, it is possible to use the fluctuation amount of the charging efficiency of the intake air as the parameter fluctuation amount. In this case, monitoring of the engine behavior is feasible, too. Furthermore, it is possible to use the fluctuation amount of the intake air amount or the fluctuation amount of the intake air pressure.

Although the variable valve mechanism used in the above-described embodiment is a stepwise changing system whose valve lift switching operation is stepwise, it is possible to use a linear changing system whose valve lift switching operation is linear (continuous). In the case of the linear changing system, it is preferable to perform the calculation of the parameter fluctuation amount and the characteristics correction when the valve lift switching exceeds a predetermined width.

Although the above-described embodiment explains an example of the variable valve system the present invention can be applied to the following operating condition changing systems:

a variable intake system which changes an air intake arrangement for introducing air into a combustion chamber; and a compression ratio changing system which changes the volume of a combustion chamber at a top dead center or a bottom dead center of a piston of the internal combustion engine so as to adequately change the compression ratio.

The present invention brings excellent effects even when it is applied to these systems. The practical example of the variable intake system is an intake pipe length changing system which is capable of selecting an intake pipe having an optimum length among various patterns of intake passages or an intake air stream generating system which is capable of selecting an intake passage having an optimum structure among various patterns of intake passages for generating tumble flow or swirl flow when the intake air is introduced into a combustion chamber. The practical example of the compression ratio changing system may change the position of a cylinder bore or a cylinder head, or may include a second piston whose movement is changeable, or may change the eccentric position of a crank shaft.

Furthermore, the present invention can be applied to not only a gasoline engine but also a diesel engine.

Second Embodiment

Figure 9:
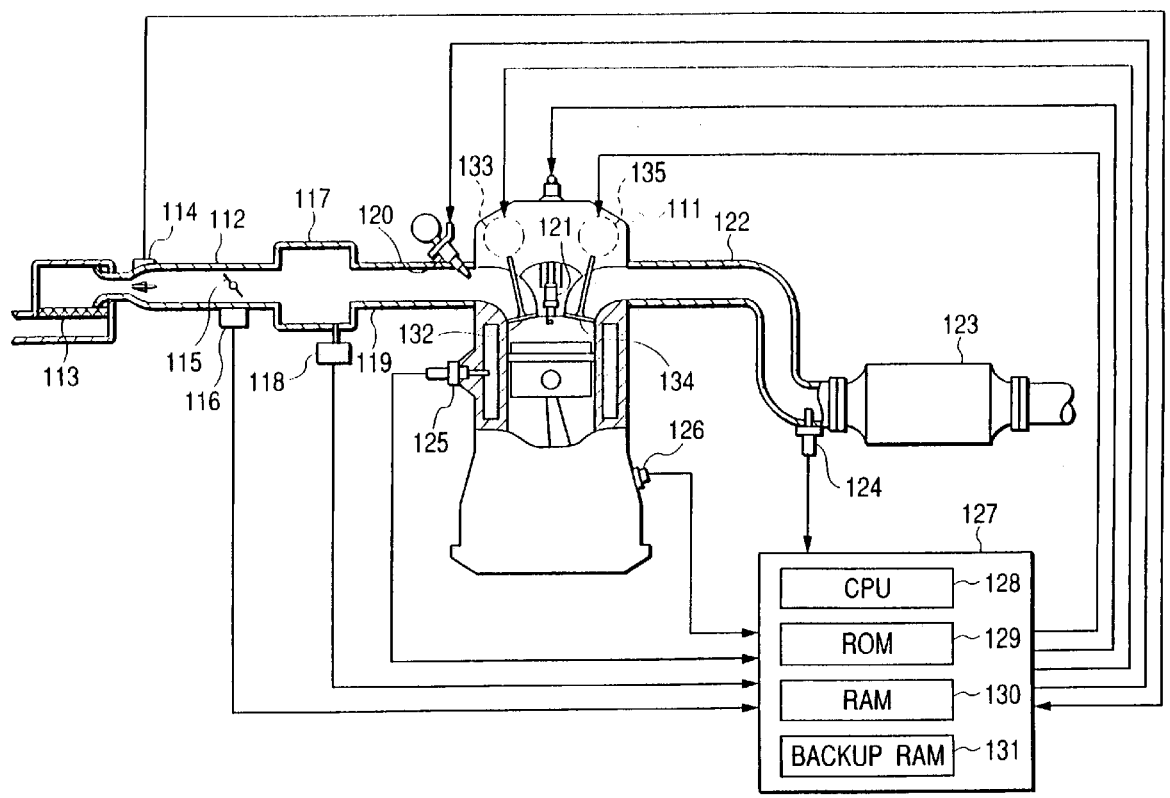
FIG. 9 is a schematic diagram showing an overall arrangement of an engine control system in accordance with a second embodiment of the present this invention.

The second embodiment of the present invention will be explained with reference to FIGS. 9 through 18. FIG. 9 shows an overall schematic arrangement of an engine control system. An internal combustion engine 111 includes an intake pipe 112 having air cleaner 113 provided at the upstream end and an air flow meter 114 provided at a downstream side of this air cleaner 113 for detecting an intake air amount. Furthermore, the engine 111 includes a throttle valve 115 whose opening degree is adjusted by a DC motor or a comparable actuator and a throttle opening degree sensor 116 which detects a throttle opening degree which are both provided at a downstream side of the air flow meter 114.

Furthermore, the engine 111 includes a surge tank 117 provided at a downstream side of the throttle valve 115. The surge tank 117 is equipped with an intake pipe pressure sensor 118 for detecting an intake pipe pressure. The surge tank 117 is integrally connected to an intake manifold 119 which introduces intake air into each cylinder of the engine 111. In each intake manifold 119, an electromagnetically driven fuel injection valve 120 is provided adjacent to an intake port of each cylinder. The fuel injection valve 120 injects fuel into the corresponding cylinder via the intake port. Furthermore, the engine 111 has a cylinder head accommodating an ignition plug 121 provided so as to correspond to each cylinder. Each ignition plug 121 generates a spark discharge between opposing electrodes to ignite the gas mixture introduce into the cylinder.

Furthermore, the engine 111 has an intake valve 132 and a variable intake valve lifting device 133 being associated with this intake valve 132. The variable intake valve lifting device 133 is capable of changing the lift amount of the intake valve 132. The engine 111 has an exhaust valve 134 and a variable exhaust valve lifting device 135 being associated with this exhaust valve 134. The variable exhaust valve lifting device 135 is capable of chancing the lift amount of the exhaust valve 134. Furthermore, it is preferable to provide a variable valve timing device capable of changing the valve timing for each of the intake valve 132 and the exhaust valve 134.

The engine 111 has an exhaust pipe 122 being equipped with a catalyst 123, such as a ternary catalyst, capable of purifying CO, HC, NOx, or other harmful substances contained in the exhaust gas. An exhaust gas sensor 124 (e.g. air-fuel ratio sensor, oxygen sensor or the like), provided at the upstream side of this catalyst 123, detects an air-fuel ratio or rich/lean of the exhaust gas.

Furthermore, a cooling water temperature sensor 125, provided on the cylinder block of the engine 111, detects a cooling water temperature. A crank angle sensor 126, provided on the cylinder block of the engine 111, generates a pulse signal in response to every advance of a predetermined crank angle (e.g., 30° CA) in the engine rotation. The crank angle and the engine rotational speed are detected based on the output signal of the crank angle sensor 126.

An engine control unit (hereinafter referred to as "ECU") 127 inputs the output signals of the above-described various sensors. ECU 127 includes a microcomputer which is chiefly composed of CPU 128, ROM 129, RAM 130, and backup RAM 131. ECU 127 executes various control programs stored in ROM 129 to control the fuel injection amount of fuel injection valve 120 and the ignition timing of ignition plug 121 in accordance with engine operating conditions.

Figure 10:
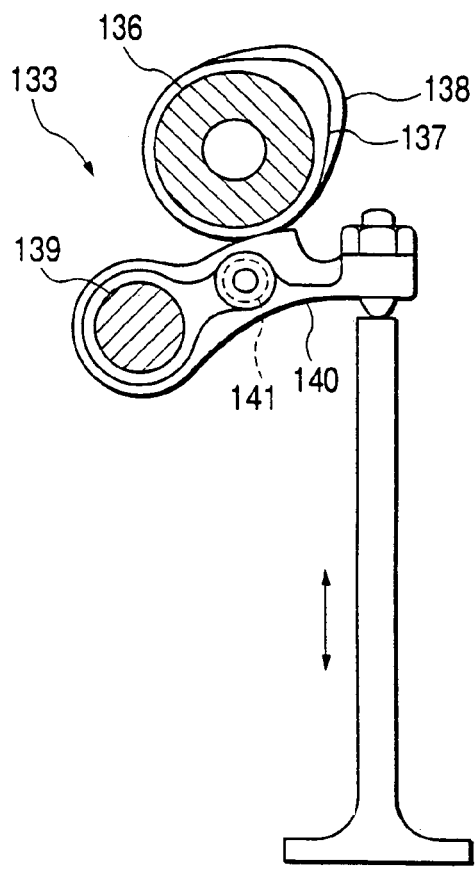
FIG. 10 is a front view showing a variable intake valve lifting device in accordance with the second embodiment of the present this invention.

FIG. 10 shows the detailed arrangement of the variable intake valve lifting device 133. The variable exhaust valve lifting device 135 has substantially the same arrangement. Therefore, the explanation for the exhaust valve lifting device 135 is omitted.

As shown in FIG. 10, a cam shaft 136 located adjacent to the intake valve 32 is provided with a low-lift cam 137 and a high-lift cam 138 which are mutually different in cam profile (i.e. lift curve). A rocker shaft 139 is located under the cam shaft 136. A rocker arm 140, rotatably supported around the rocker shaft 139, swings about the axis of the rocker shaft 139 in the up-and-down direction. A distal end of the swingable rocker arm 140 contacts with the upper end of the intake valve 132 so that the intake valve 132 can cause an up-and-down lift action in synchronism with the swing motion of the rocker arm 140.

The rocker arm 140 consists of a low-lift cam pressing portion (not shown) being brought into contact with the low-lift cam 137 and a high-lift cam pressing portion (not shown) being brought into contact with the high-lift cam 138. The low-lift cam 137 has an outer configuration for giving the low-lift cam pressing portion of the rocker arm 140 a smaller pressing amount and a shorter pressing duration. The high-lift cam 138 has an outer configuration for giving the high-lift cam pressing portion of the rocker arm 140 a larger pressing amount and a longer pressing duration.

Furthermore, a hydraulically driven cam switching mechanism 141 is provided on the rocker arm 140. The cam switching mechanism 141 performs the switching operation between a low-lift cam activated condition and a high-lift cam activated condition. In the low-lift cam activated condition, the low-lift cam 137 presses the low-lift cam pressing portion of the rocker arm 140 to drive the intake valve 132. In the high-lift cam activated condition, the high-lift cam 138 presses the high lift cam pressing portion of the rocker arm 140 to drive the intake valve 132.

When the control mode of the variable intake valve lifting device 133 is switched to a low-lift mode where the intake valve 132 has a small lift amount, the cam switching mechanism 141 is switched into the low-lift cam activated condition so that the low-lift cam 137 presses the low-lift cam pressing portion of the rocker arm 140 to drive the intake valve 132. With this operation, as shown by a dotted line in FIG. 11, the pressing amount of the rocker arm 140 becomes small. The lift amount of the intake valve 132 becomes small. The pressing duration of the rocker arm 140 becomes short. The valve-open duration of the intake valve 132 becomes short.

On the other hand, when the control mode of the variable intake valve lifting device 133 is switched to a high-lift mode where the intake valve 132 has a large lift amount, the cam switching mechanism 141 is switched into the high-lift cam activated condition so that the high-lift cam 138 presses the high-lift cam pressing portion of the rocker arm 140 to drive the intake valve 132. With this operation, as shown by a solid line in FIG. 11, the pressing amount of the rocker arm 140 becomes large. The lift amount of the intake valve 132 becomes large. The pressing duration of the rocker arm 140 becomes long. The valve-open duration of the intake valve 132 becomes long.

Figure 12:
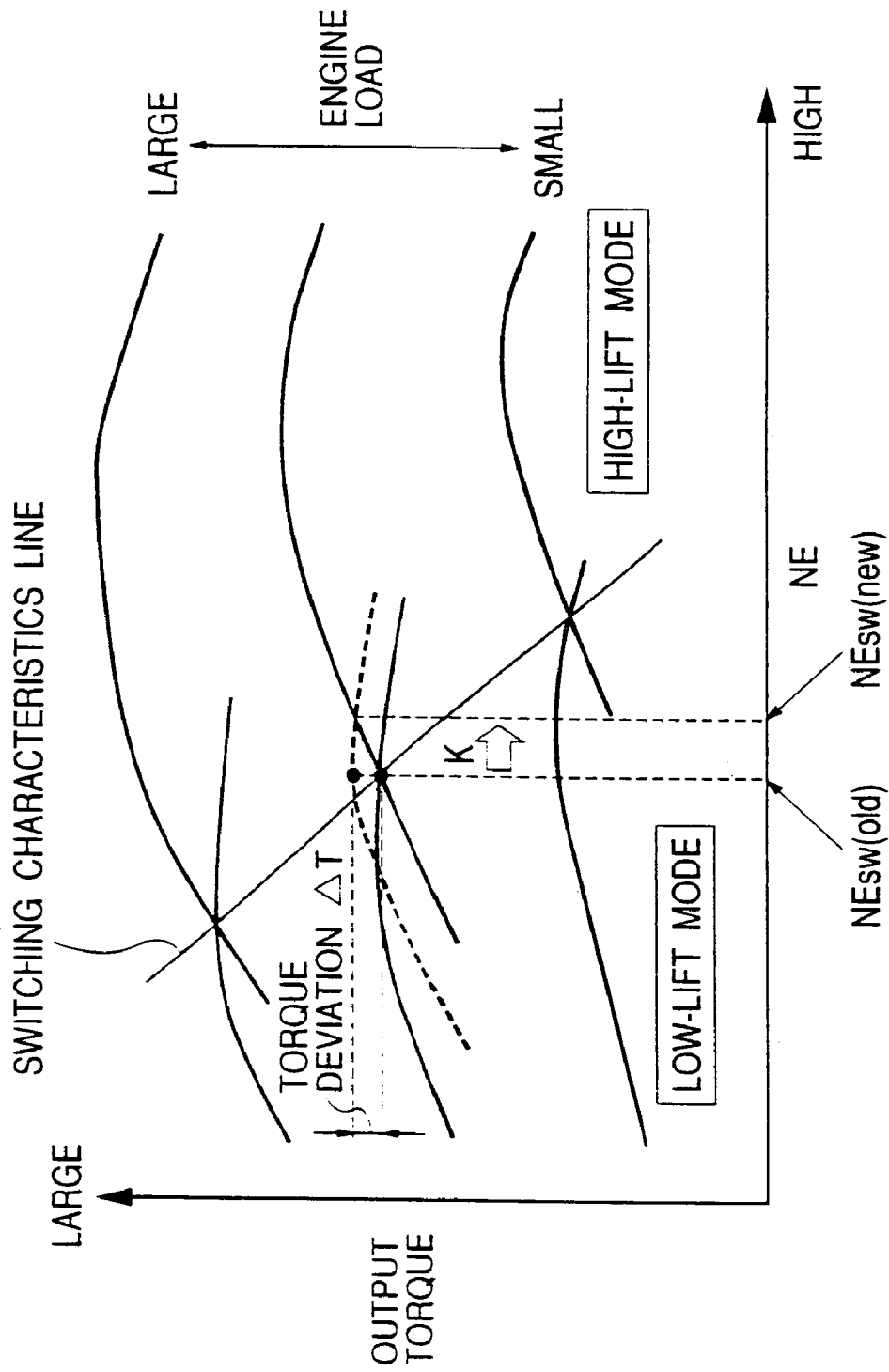
FIG. 12 is a graph showing an example of a control mode switching map in accordance with the second embodiment of the present this invention.
Figure 14:
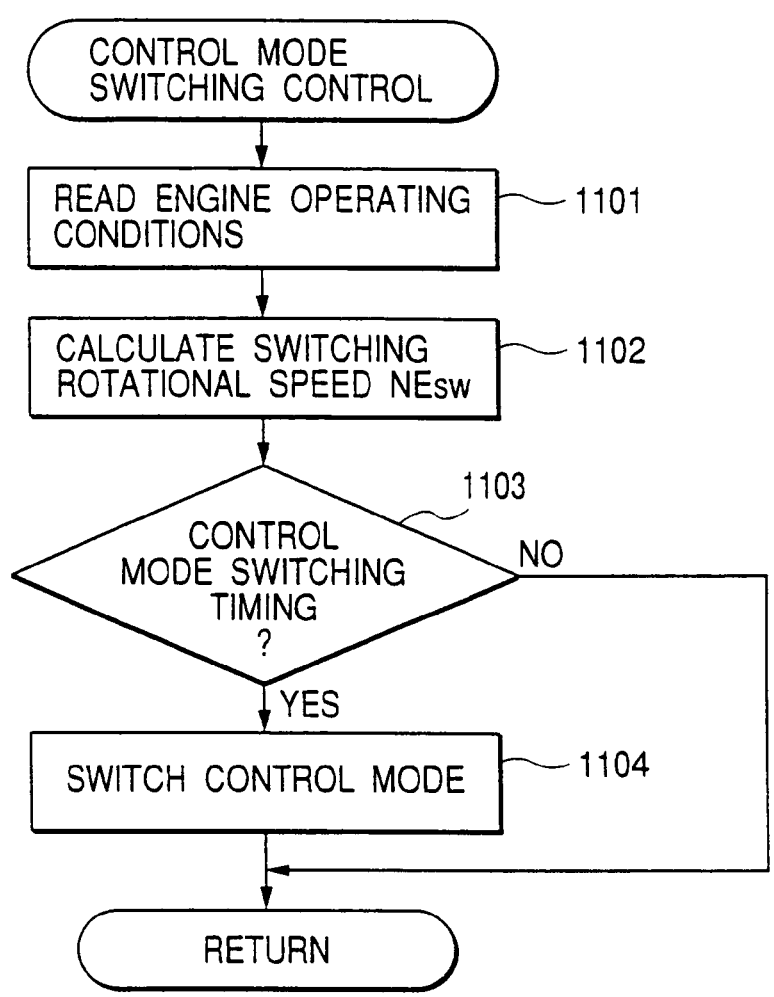
FIG. 14 is a flowchart showing the processing flow of a control mode switching control program in accordance with the second embodiment of the present this invention.

ECU 127 executes the control mode switching control program shown in FIG. 14 to switch the control mode of the variable intake valve lifting device 133 between the low-lift mode and the high-lift mode in accordance with the engine operating conditions (e.g. engine rotational speed NE, engine load, etc.) with reference to the control mode switching map shown in FIG. 12. The control mode switching map shown in FIG. 12 defines a switching rotational speed $NE_{SW}$ as an engine speed where the control mode is switched. The switching rotational speed $NE_{SW}$ is an engine rotational speed NE where an output torque obtained when the engine 111 is driven in the low-lift mode condition of the variable intake valve lifting device 133 becomes equal to an output torque obtained when the engine 111 is driven in the high-lift mode condition of the variable intake valve lifting device 133. The switching rotational speed $NE_{SW}$ is defined for each engine load (e.g. intake pipe pressure, intake air amount, etc.). The line connecting the switching rotational speeds $NE_{SW}$ corresponding to respective engine loads is a switching characteristics line. The initial data on the control mode switching map shown in FIG. 12 are prepared beforehand based on experimental data, designing data, etc. and are stored in he ROM 129 of ECU 127 or in a comparable nonvolatile memory.

Figure 11:
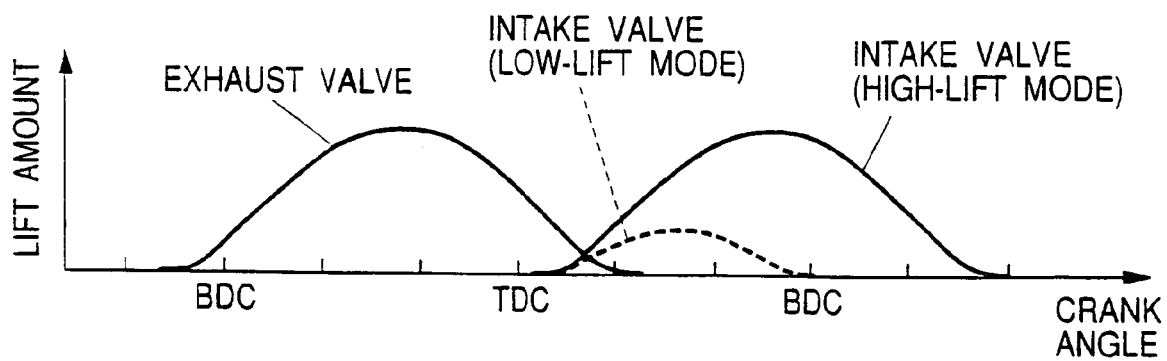
FIG. 11 is graph showing valve lift characteristics of the variable intake valve lifting device in a low-lift mode and a high-lift mode in accordance with the second embodiment of the present this invention.

When the engine rotational speed NE reaches a switching rotational speed $NE_{SW}$ corresponding to the present engine load (namely, when the engine rotational speed NE crosses the switching characteristics line shown in FIG. 11), ECU 127 switches the control mode of the variable intake valve lifting device 133 between the low-lift mode and the high-lift mode so as to suppress the torque variation during the control mode switching operation performed by the variable intake valve lifting device 133.

Figure 13:
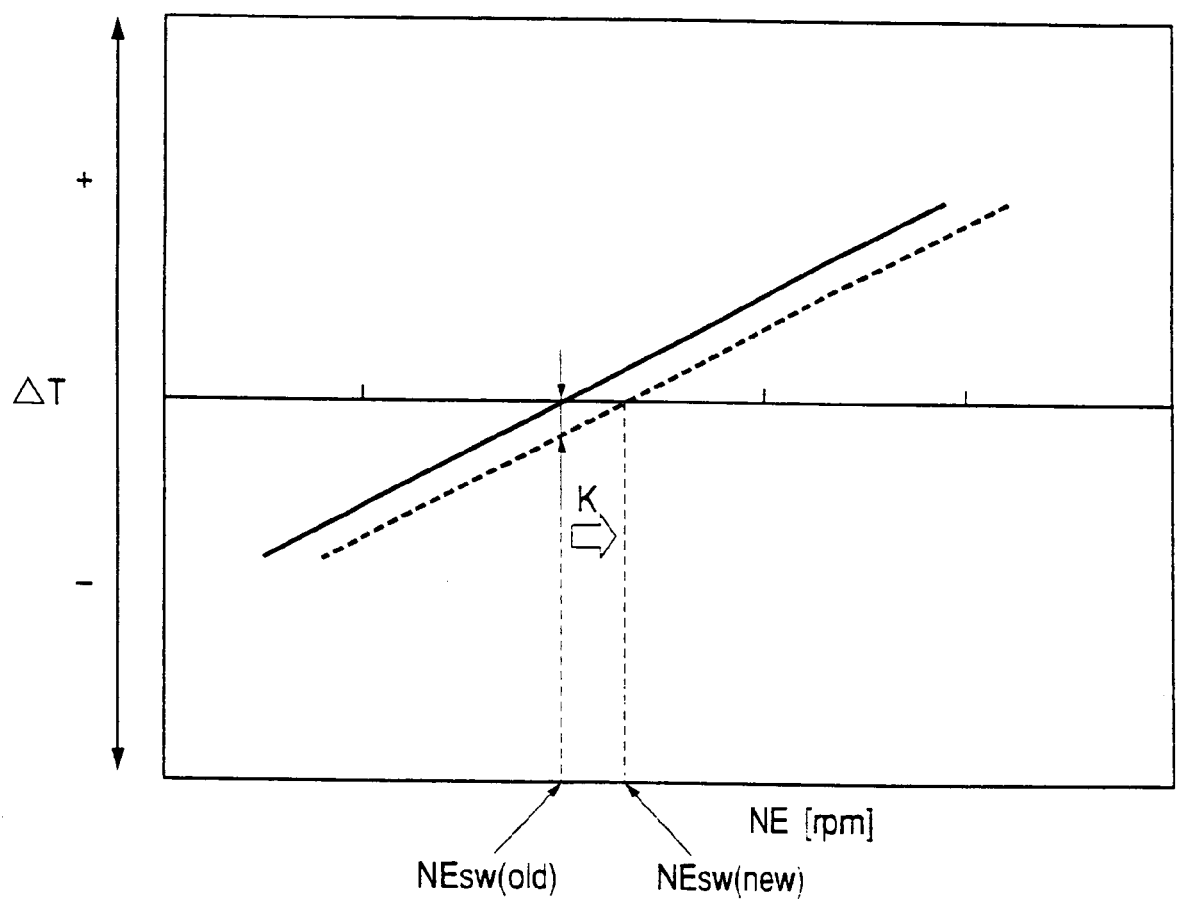
FIG. 13 is a graph showing the relationship between a torque deviation and an engine rotational speed in the control mode switching operation.

However, even if the switching rotational speed $NE_{SW}$ is accurately defined beforehand to maintain the same output torque before and after the control mode switching operation of the variable intake valve lifting device 133, there is the possibility that the torque characteristics in either control mode may change due to individual differences, aging changes, environmental change etc. as shown by a dotted line in FIG. 12 or FIG. 13. In such a case, if the control mode is switched at the initially prepared switching rotational speed $NE_{SW}$ (old), a significant deviation of the output torque will be caused before and after the control mode switching operation. Accordingly, a torque variation appears during the control mode switching operation of the variable intake valve lifting device 133. And, a torque shock is given to a driver.

Hence, ECU 127 executes the estimated torque calculation program shown in FIG. 15 to calculate an estimated value of the output torque of the engine 111(hereinafter referred to as "estimated torque") based on engine operating conditions (e.g. intake air amount, intake pipe pressure, engine rotational speed, etc.) Furthermore, ECU 127 executes the torque deviation calculation program shown in FIG. 16 as well as the switching rotational speed correction program shown in FIG. 17. Through these processing, ECU 127 learns an estimated torque (hereinafter, referred to as "pre-switching estimated torque") calculated immediately before the control mode of the variable intake valve lifting device 133 is switched and an estimated torque (hereinafter, referred to as "post-switching estimated torque") calculated immediately after the control mode is switched. ECU 127 calculates a switching rotational speed correction amount K so as to reduce (or eliminate) a torque a deviation ΔT between the pre-switching estimated torque and the post-switching estimated torque. And, ECU 127 corrects memory data $NE_{SW}$(old) of the switching rotational speed $NE_{SW}$ with the switching rotational speed correction amount K to obtain a new switching rotational speed $NE_{SW}$(new) (refer to FIGS. 12 and 13).

$$NE_{SW}(\text{new})=NE_{SW}(\text{old})+K$$

The switching characteristics line data shown in the control mode switching map of FIG. 12 are renewed based on the switching rotational speed $NE_{SW}$(new) resulting from the correction processing. The renewed switching characteristics line data are stored in the backup RAM 131 of ECU 127 or in a comparable rewritable nonvolatile memory.

Hereinafter, the processing contents of respective programs shown in FIGS. 14 through FIG. 17 executed by ECU 127 will be explained.

Control Mode Switching Control

ECU 127 executes the control mode switching control program shown in FIG. 14 at predetermined intervals during the operation of the engine. When this program is activated first at step 1101, ECU 127 reads the engine rotational speed NE and the engine load (e.g. intake pipe pressure, intake air amount, throttle opening degree, etc.) as present engine operating conditions.

Then, in step 1102, ECU 127 calculates (or reads) the switching rotational speed $NE_{SW}$ corresponding to the present engine load with reference to the control mode switching map shown in FIG. 12. Then, in step 1103, ECU 127 makes a judgment with respect to the switching timing for the control mode of the variable intake valve lifting device 133 by checking as to whether or not the present engine rotational speed NE has reached the switching rotational speed $NE_{SW}$. When it is not the switching timing for the control mode of the variable intake valve lifting device 133 (i.e. NO in step 1103), ECU 127 terminates this program without changing the present control mode of the variable intake valve lifting device 133.

On the other hand, when it is judged that the switching timing for the control mode of the variable intake valve lifting, device 133 has come (i.e. YES in step 1103), ECU 127 proceeds to step 1104 to switch the control mode of the variable intake valve lifting device 133. When the engine rotational speed NE has reached the switching rotational speed $NE_{SW}$ from a lower rotational side, ECU 127 switches the control mode of the variable intake valve lifting device 133 from the low-lift mode to the high-lift mode. On the contrary, when the engine rotational speed NE has reached the switching rotational speed $NE_{SW}$ from a higher rotational side, ECU 127 switches the control mode of the variable intake valve lifting device 133 from the high-lift mode to the low-lift mode.

Estimated Torque Calculation

Figure 15:
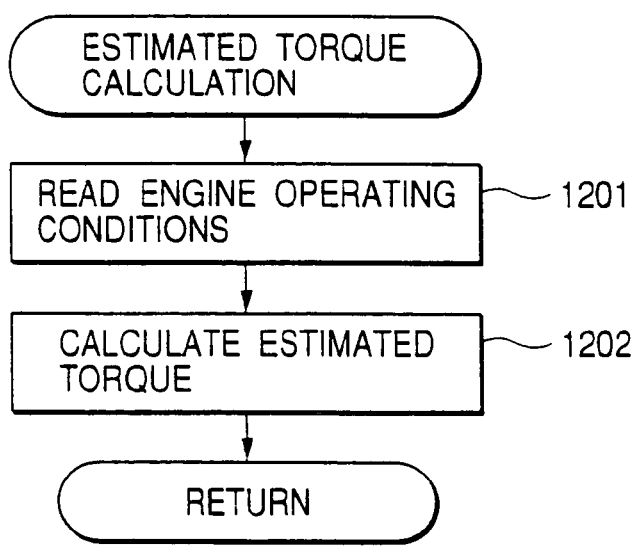
FIG. 15 is a flowchart showing the processing flow of an estimated torque calculation program in accordance with the second embodiment of the present this invention.

ECU 127, serving as torque calculating means of the present invention, executes the estimated torque calculation program shown in FIG. 15 at predetermined intervals during the operation of the engine. When this program is activated, first at step 1201, ECU 127 reads the present engine operating conditions (i.e. intake air amount, intake pipe pressure, engine rotational speed, air-fuel ratio, throttle opening degree, etc.) Then, ECU 127 proceeds to step 1202 to calculate an estimated torque of he engine 111 based on the readout present engine operating conditions with reference to a map or equation.

Torque Deviation Calculation

Figure 16:
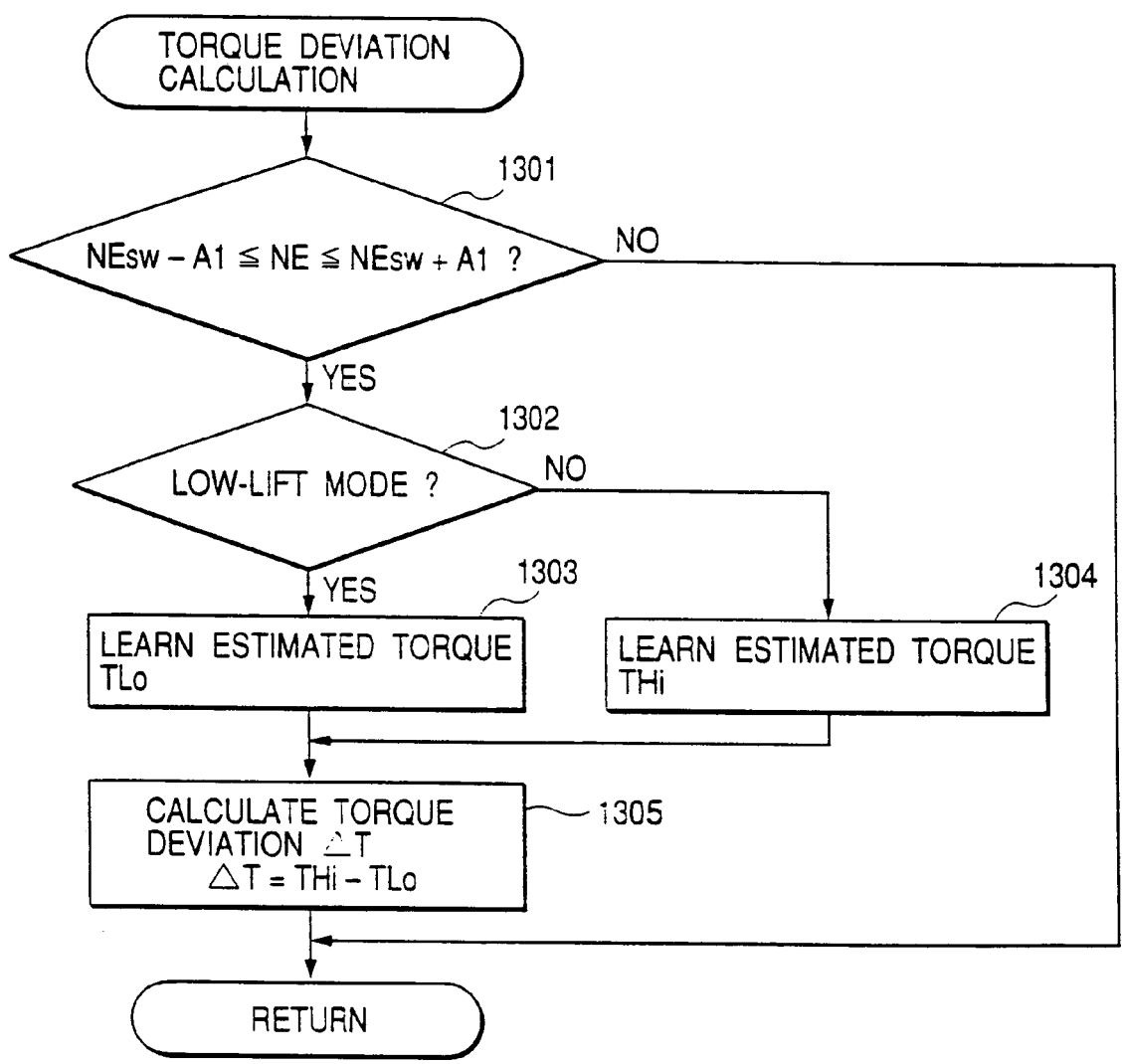
FIG. 16 is a flowchart showing the processing flow of a torque deviation calculation program in accordance with the second embodiment of the present this invention.

ECU 127 executes the torque deviation calculation program shown in FIG. 16 at predetermined intervals during the operation of the engine. When this program is activated, first at step 1301, ECU 127 makes a judgment as to whether or not the engine rotational speed NE is in the vicinity of the switching rotational speed $NE_{SW}$ corresponding to the momentary engine load. More specifically, ECU 127 checks whether the engine rotational speed NE is within a range of the switching rotational speed $NE_{SW}\pm$ predetermined value A1 (i.e. $NE_{SW}-A1 \leq NE \leq NE_{SW}+A1$).

When the present engine rotational speed NE is not in the vicinity of the switching rotational speed $NE_{SW}$ (i.e. NO in step 1301), ECU 127 terminates this program without executing step 1302 and succeeding processing. On the other hand, when the present engine rotational speed NE is in the vicinity of the switching rotational speed $NE_{SW}$ (i.e. YES in step 1301), ECU 127 proceeds to step 1302 to further check whether or not the present control mode is the low-lift mode.

When the present control mode is the low-lift mode (i.e. YES in step 1302), ECU 127 proceeds to step 1303 to learn the present estimated torque as an estimated torque TLo in the low-lift mode. On the other hand, when the present control mode is the high-lift mode (i.e. NO in step 1302), ECU 127 proceeds to step 1304 to learn the present estimated torque as an estimated torque THi in the high-lift mode.

Through the above learning processing in respective steps 1303 and 1304, ECU 127 obtains learning values of the pre-switching estimated torque and the post-switching estimated torque. More specifically, when the engine rotational speed NE exceeds the switching rotational speed $NE_{SW}$ from the lower-rotation side, and accordingly when the control mode is switched from the low-lift mode to the high-lift mode, the estimated torque TLo in the low-lift mode learned in the step 1303 is regarded as the pre-switching estimated torque and the estimated torque THi in the high-lift mode learned in the step 1304 is regarded as the post-switching estimated torque.

On the other hand, when the engine rotational speed NE exceeds the switching rotational speed $NE_{SW}$ from the higher-rotation side, and accordingly when the control mode is switched from the high-lift mode to the low-lift mode, the estimated torque THi in the high-lift mode learned in the step 1304 is regarded as the pre-switching estimated torque and the estimated torque TLo in the low-lift mode learned in the step 1303 is regarded as the post-switching estimated torque.

ECU 127, when executing the processing of these steps 1303 and 1304, serves as the torque learning means of the present invention.

After learning both the high-lift mode estimated torque THi and the low-lift mode estimated torque TLo, ECU 127 proceeds to step 1305 to calculate a torque deviation $\Delta T$ between the high-lift mode estimated torque THi and the low-lift mode estimated torque TLo, thereby calculating the torque deviation $\Delta T$ during the control mode switching operation (i.e. torque deviation $\Delta T$ between the pre-switching estimated torque and the post-switching estimated torque).

$$\Delta T = THi - TLo$$

$$\Box T = THi - TLo$$

Switching Rotational Speed Correction

Figure 17:
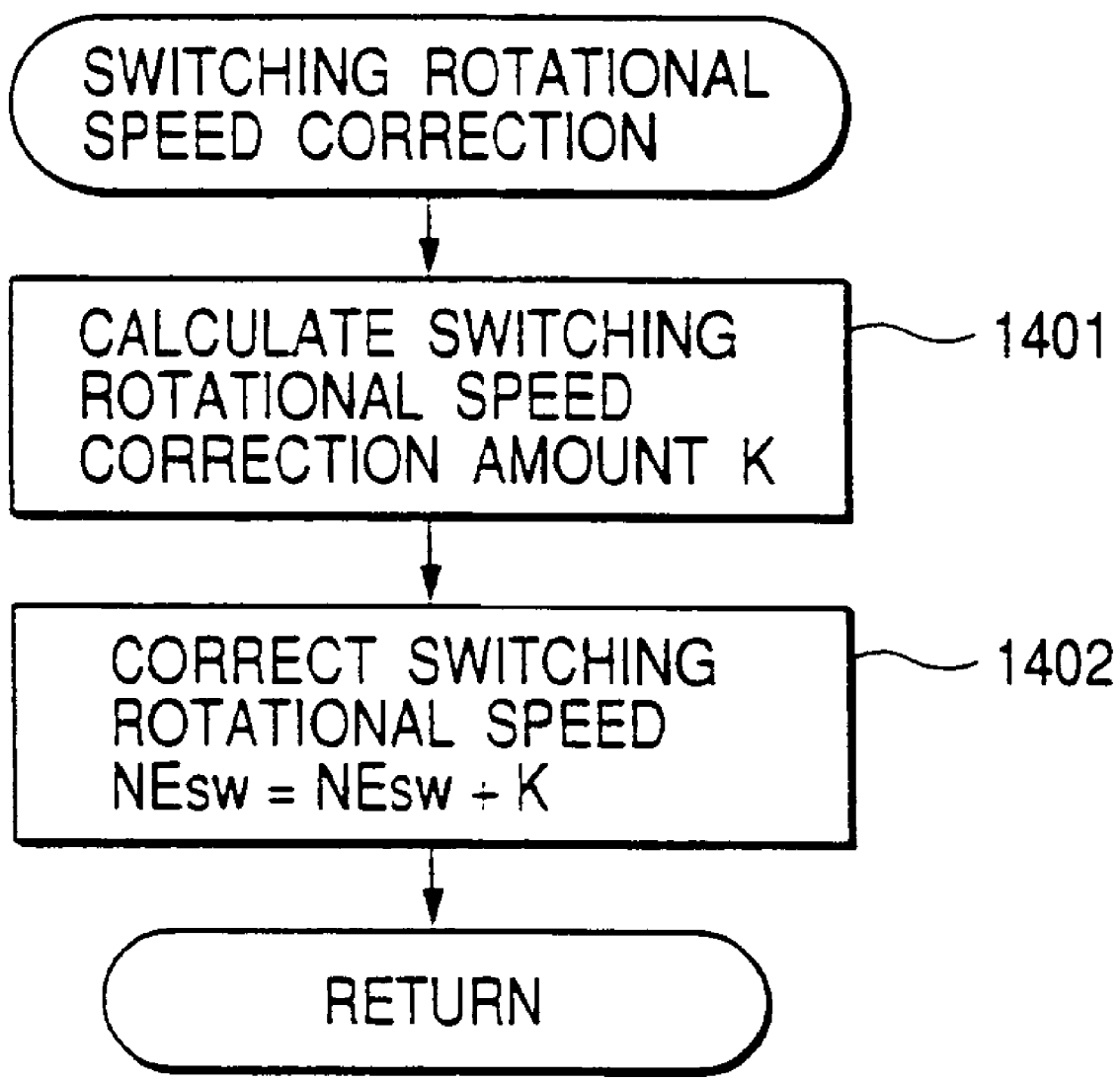
FIG. 17 is a flowchart showing the processing flow of a switching rotational speed correction program in accordance with the second embodiment of the present this invention.

ECU 127, serving as control mode switching characteristics correcting means of the present invention, executes the switching rotational speed correction program shown in FIG. 17 at predetermined intervals during the operation of the engine. When this program is activated, first in step 1401, ECU 127 calculates a switching rotational speed correction amount K corresponding to the torque deviation $\Delta T$ during the control mode switching operation with reference to a table shown in FIG. 18. The table shown in FIG. 18 defines the switching rotational speed correction amount K so as to reduce (or eliminate) the torque deviation $\Delta T$ during the control mode switching operation.

Then, ECU 127 proceeds to step 1402 to correct the present switching rotational speed $NE_{SW}$ with the switching rotational speed correction amount K.

$$NE_{SW} = NE_{SW} + K$$

The switching characteristics line data on the control mode switching map of FIG. 12 is renewed based on the corrected switching rotational speed $NE_{SW}$.

As described above, the second embodiment learns the pre-switching estimated torque calculated immediately before the control mode of the variable intake valve lifting device 33 is switched as well as the post-switching estimated torque calculated immediately after the control mode is switched. Furthermore, the second embodiment corrects the switching rotational speed $NE_{SW}$ so as to reduce (or eliminate) the torque deviation $\Delta T$ between the pre-switching estimated torque and the post-switching estimated torque.

Accordingly, even when a significant output torque deviation occurs before and after the control mode switching operation in either control mode of the variable intake valve lifting device 133 in response to change of torque characteristics occurring due to individual differences, aging changes, environmental change, etc., it is possible to correct the switching rotational speed $NE_{SW}$ so as to reduce (or eliminate) the output torque deviation. Thus, it becomes possible to reduce (or eliminate) the torque variation occurring during the control mode switching operation of the variable intake valve lifting device 133. Accordingly, this embodiment can suppress the torque variation occurring during the control mode switching operation of the variable intake valve lifting device 33 being adversely influenced by the change of torque characteristics occurring due to individual differences, aging changes, environmental change, etc. The switching operation of the control mode of the variable intake valve lifting device 133 can be smoothly done without giving any torque shock to a driver.

Although the second embodiment corrects the switching characteristics of the control mode by correcting the switching rotational speed $NE_{SW}$, it is possible to use the engine load (e.g. intake pipe pressure, intake air amount, throttle opening degree, etc.) to correct the switching characteristics of the control mode.

Third Embodiment

Next, a third embodiment of this invention will be explained with reference to FIGS. 19 to 21.

According to the third embodiment of this invention, ECU 127 executes the estimated torque calculation program shown in FIG. 15 and the torque deviation calculation program shown in FIG. 16 in the same manner as the second embodiment. Thus, ECU 127 calculates the torque deviation $\Delta T$ during the control mode switching operation (i.e. torque deviation $\Delta T$ between the pre-switching estimated torque and the post-switching estimated torque).

Figure 19:
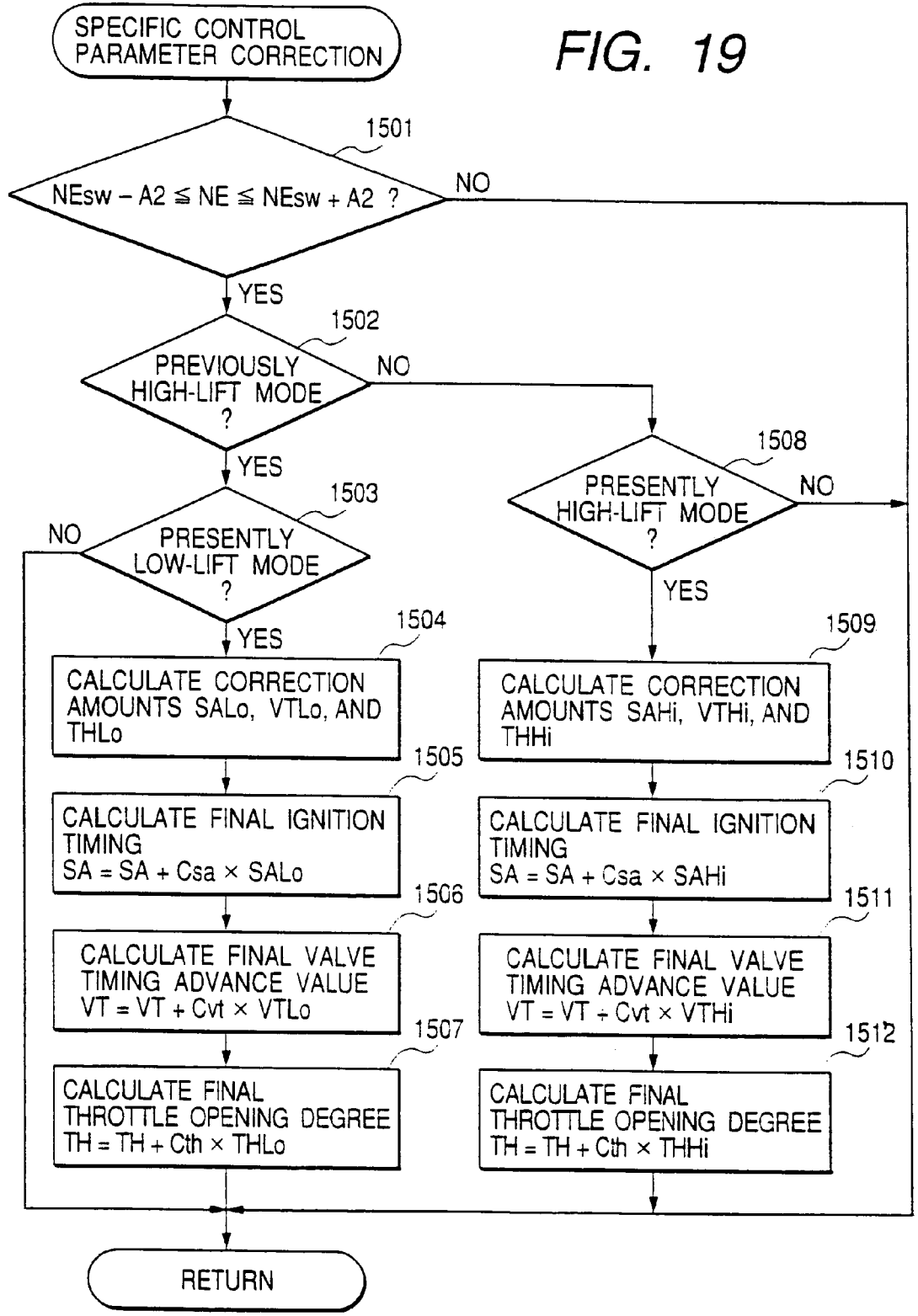
FIG. 19 is a flowchart showing the processing flow of a specific control parameter correction program in accordance with a third embodiment of the present this invention.

Furthermore, ECU 127 executes the specific control parameter correction program shown in FIG. 19 to correct a specific control parameter (e.g. ignition timing SA, valve timing advance value VT, and throttle opening degree TH)

in a selected control mode when the control mode of the variable intake valve lifting device 133 is switched to this selected control mode, so as to reduce (or eliminate) the torque deviation ΔT during the control mode switching operation.

ECU 127, serving as specific control parameter correcting means of the present invention, executes the specific control parameter correction program shown in FIG. 19 at predetermined intervals during the operation of the engine. When this program is activated, first in step 1501, ECU 127 makes a judgment as to whether or not the present engine rotational speed NE is in the vicinity of the switching rotational speed $NE_{SW}$ corresponding to the momentary engine load. More specifically, ECU 127 checks whether the engine rotational speed NE is within a range of the switching rotational speed $NE_{SW} \pm$ predetermined value A2 (i.e. $NE_{SW} - A2 \leq NE \leq NE_{SW} + A2$).

When the present engine rotational speed NE is not in the vicinity of the switching rotational speed $NE_{SW}$ (i.e. NO in step 1501), ECU 127 terminates this program without executing step 1502 and succeeding processing.

On the other hand, when the present engine rotational speed NE is in the vicinity of the switching rotational speed $NE_{SW}$ (i.e. YES in step 1501), ECU 127 proceeds to step 1502 to further check whether or not the previous control mode is the high-lift mode. When the previous control mode is the high-lift mode (i.e. YES in step 1502), ECU 127 proceeds to step 1503 to further check whether or not the present control mode is the low-lift mode.

When the present control mode is the high-lift mode and is not the low-lift mode (i.e. NO in step 1503), namely when it is judged that both of the previous control mode and the present control mode are high-lift mode, ECU 127 concludes that it is not immediately after the control mode switching operation, and terminates this program without executing step 1504 and succeeding processing.

When the present control mode is the low-lift mode (i.e. YES in step 1503), ECU 127 concludes that it is immediately after the control mode is switched from the high-lift mode to the low-lift mode. Then, ECU 127 proceeds to step 1504 to calculate (or read) an ignition timing correction amount SALo, a valve timing correction amount VTLo, and a throttle opening degree correction amount THLo in accordance with the torque deviation ΔT during the control mode switching operation with reference to a table for the low-lift mode switching operation shown in FIG. 20.

The table data for the ignition timing correction amount SALo is equivalent to an amount required when the torque deviation ΔT during the control mode switching operation is cancelled by only a torque change produced by the ignition timing correction. The table data for the valve timing correction amount VTLo is equivalent to an amount required when the torque deviation ΔT during the control mode switching operation is cancelled by only a torque change produced by the valve timing correction. Similarly, the table data for the throttle opening degree correction amount THLo is equivalent to an amount required when the torque deviation ΔT during the control mode switching operation is cancelled by only the throttle opening degree correction.

Then, ECU 127 proceeds to steps 1505 to 1507 to obtain a final ignition timing SA for the low-lift mode switching operation, a final valve timing advance value VT for the low-lift mode switching operation, and a final throttle opening degree TH for the low-lift mode switching operation, respectively. ECU 127 calculates the final ignition timing SA for the low-lift mode switching operation based on the present ignition timing AS for the low-lift mode switching operation and the ignition timing correction amount ASLo with reference to the following equation. ECU 127 calculates the final valve timing advance value VT for the low-lift mode switching operation based on the present valve timing advance value VT for the low-lift mode switching operation and the valve timing correction amount VTLo with reference to the following equation. Similarly, ECU 127 calculates the final throttle opening degree TH for the low-lift mode switching operation based on the present throttle opening degree TH for the low-lift mode switching operation and the throttle opening degree correction amount THLo with reference to the following equation.

$$SA = SA + Csa \times SALo$$

$$VT = VT + Cvt \times VTLo$$

$$TH = TH + Cth \times THLo$$

where Csa, Cvt, Cth are correction coefficients with respect to the torque correction respectively determining the mutual contribution ratios among the ignition timing correction amount SALo, the valve timing correction amount VTLo, and the throttle opening degree correction amount THLo. These correction coefficients satisfy the relationship of Csa+Cvt+Cth=1. These correction coefficients Csa, Cvt and Cth are determined beforehand based on the experimental data, designing data, etc. so as to prevent each correction amount (i.e. ignition timing correction amount SALo, valve timing correction amount VTLo, and throttle opening degree correction amount THLo) from giving adverse influence to the operation of the engine 11.

In this manner, the third embodiment corrects the ignition timing SA, the valve timing advance value VT, and the throttle opening degree TH for the low-lift mode switching operation when the control mode of the variable intake valve lifting device 133 is switched from the high-lift mode to the low-lift mode. Thus, it becomes possible to cancel the torque change occurring during the control mode switching operation of the variable intake valve lifting device 133 with all (or at least two) of the torque change produced by the correction of the ignition timing SA, the torque change produced by the correction of the valve timing advance value VT, and the torque change produced by the correction of the throttle opening degree TH.

Subsequently, ECU 127 gradually reduces the ignition timing correction amount ASLo, the valve timing correction amount VTLo, and the throttle opening degree correction amount THLo, respectively, until these values become 0.

When the previous control mode is not the high-lift mode (i.e. NO in step 1502), ECU 127 proceeds to step 1508 to further check whether or not the present control mode is the high-lift mode.

When the present control mode is the low-lift mode and is not the high-lift mode (i.e. NO in step 1508), namely when it is judged that both of the previous control mode and the present control mode are low-lift mode, ECU 127 concludes that it is not immediately after the control mode switching operation, and terminates this program without executing step 1509 and succeeding processing.

When the present control mode is the high-lift mode (i.e. YES in step 1508). ECU 127 concludes that it is immediately after the control mode is switched from the low-lift mode to the high-lift mode. Then, ECU 127 proceeds to step 1509 to calculate (or read) an ignition timing correction amount SAHi, a valve timing correction amount VTHi, and a throttle opening degree correction amount THHi in accordance with the torque deviation ΔT during the control mode switching operation with reference to a table for the high-lift mode switching operation shown in FIG. 21.

The table data for the ignition timings correction amount SAHi is equivalent to an amount required when the torque deviation ΔT during the control mode switching operation is cancelled by only a torque change produced by the ignition timing correction. The table data for the valve timing correction amount VTHi is equivalent to an amount required when the torque deviation ΔT during the control mode switching operation is cancelled by only a torque change produced by the valve timing correction. Similarly, the table data for the throttle opening degree correction amount THHi is equivalent to an amount required when the torque deviation ΔT during the-control mode switching operation is cancelled by only the throttle opening degree correction.

Then, ECU 127 proceeds to steps 1510 to 1512 to obtain a final ignition timing SA for the high-lift mode switching operation, a final valve timing advance value VT for the high-lift mode switching operation, and a final throttle opening degree TH for the high-lift mode switching operation, respectively. ECU 127 calculates the final ignition timing SA for the high-lift mode switching operation based on the present ignition timing AS for the high-lift mode switching operation and the ignition timing correction amount ASHi with reference to the following equation. ECU 127 calculates the final valve timing advance value VT for the high-lift mode switching operation based on the present valve timing advance value VT for the high-lift mode switching operation and the valve timing correction amount VTHi with reference to the following equation. Similarly, ECU 127 calculates the final throttle opening degree TH for the high-lift mode switching operation based on the present throttle opening degree TH for the high-lift mode switching operation and the throttle opening degree correction amount THHi with reference to the following equation.

$$SA = SA + Csa \times SAHi$$

$$VT = VT + Cvt \times VTHi$$

$$TH = TH + Cth \times THHi$$

where Csa, Cvt, Cth are correction coefficients with respect to the torque correction respectively determining the mutual contribution ratios among the ignition timing correction amount SAHi, the valve timing correction amount VTHi, and the throttle opening degree correction amount THHi. These correction coefficients satisfy the relationship of Csa+Cvt+Cth=1. These correction coefficients Csa, Cvt, and Cth are determined beforehand based on the experimental data, designing data, etc. so as to prevent each correction amount (i.e. ignition timing correction amount SAHi, valve timing correction amount VTHi, and throttle opening degree correction amount THHi) from giving adverse influence to the operation of the engine 11.

In this manner, the third embodiment corrects the ignition timing SA, the valve timing advance value VT, and the throttle opening degree TH for the high-lift mode switching operation when the control mode of the variable intake valve lifting device 133 is, switched from the low-lift mode to the high-lift mode. Thus, it becomes possible to cancel the torque change occurring during the control mode switching operation of the variable intake valve lifting device 133 with all (or at least two) of the torque change produced by the correction of the ignition timing SA, the torque change produced by the correction of the valve timing advance value VT, and the torque change produced by the correction of the throttle opening degree TH.

Subsequently, ECU 127 gradually reduces the ignition timing correction amount ASHi, the valve timing correction amount VTHi, and the throttle opening degree correction amount THHi, respectively, until these values become 0.

As apparent from the foregoing, the third embodiment corrects the specific control parameter (e.g. ignition timing SA, valve timing advance value VT, and throttle opening decree TH) in a selected control mode when the control mode of the variable intake valve lifting device 133 is switched to this selected control mode so as to reduce (or eliminate) the torque deviation ΔT during the control mode switching operation. Thus, it becomes possible to cancel the torque change occurring during the control mode switching operation of the variable intake valve lifting device 133 with the summed-up torque changes produced by the corrections of specific control parameters (at least two of the ignition timing SA, the valve timing advance value VT, and the throttle opening degree TH). The torque variation occurring during the control mode switching operation of the variable intake valve lifting device 133 can be reduced (or eliminated). Thus, the third embodiment can suppress the torque variation occurring during the control mode switching operation of the variable intake valve lifting device 133 without being adversely influenced by the change of torque characteristics occurring due to individual differences, aging changes, environmental change, etc. The control mode switching operation of the variable intake valve lifting device 133 can be smoothly performed without giving any torque shock to a driver.

Furthermore, the third embodiment corrects a total of three parameters, i.e. ignition timing AS, valve timing advance value VT, and throttle opening degree TH, as the specific control parameters. In other words, the third embodiment can cancel the torque change occurring during the control mode switching operation of the variable intake valve lifting device 133 with a summation of the torque change produced by the ignition timing correction, the torque change produced by the valve timing correction, and the torque change produced by the throttle opening degree correction. Accordingly, it is not necessary to excessively increase the correction amount of each specific control parameter (i.e. ignition timing correction amount, valve timing correction amount, and throttle opening degree correction amount). The contribution ratios of respective correction amounts with respect to the torque correction can be arbitrarily and appropriately determined so that no adverse influence is given to the engine 111.

However, it is not always necessary to correct all of the ignition timing, the valve timing, and the throttle opening degree. It is thus possible to correct only two of these parameters. It will bring better result than relying on the correction of only one parameter. It is also preferable to correct other parameters (e.g. fuel injection amount, airflow control valve opening, EGR valve opening, degree, etc.) instead of using the ignition timing, the valve timing, and the throttle opening decree.

The third embodiment corrects the specific control parameter in a selected control mode when the control mode of the variable intake valve lifting device 133 is switched to this selected control mode so as to reduce (or eliminate) the torque deviation between the pre-switching estimated torque and the post-switching estimated torque.

However, according to the third embodiment, ECU 127 can detect the information relating to the output torque of the engine 111 (e.g. engine rotational speed, air-fuel ratio, intake air amount, intake pipe pressure, fuel injection amount, etc). In this case, ECU 127 leans pre-switching torque information detected immediately before the control mode of the variable intake valve lifting device 133 is switched as well as post-switching torque information detected immediately after the control mode is switched. Then, ECU 127 corrects the specific control parameter in a selected control mode when the control mode of the variable intake valve lifting device 133 is switched to this selected control mode, so as to reduce (or eliminate) the deviation between the pre-switching torque information and the post-switching torque information.

According to the above-described modified arrangement of the third embodiment, the engine 111 is not required to possess the capability of calculating the output torque. ECU 127 can use the information relating to the output torque of the engine 111 (e.g. engine rotational speed, air-fuel ratio, intake air amount, intake pipe pressure, fuel injection amount, etc) to cancel the torque change occurring during the control mode switching operation of the variable intake valve lifting device 133 with the torque change produced by the correction of the specific control parameter. Thus, it becomes possible to reduce (or eliminate) the torque variation during the control mode switching operation of the variable intake valve lifting device 133.

Although the above described second and third embodiments are based on the system capable of switching the control mode of the variable valve lifting device 133 located at the intake side of the engine 111. However, it is needless to say that this invention is equally applied to the system capable of switching the control mode of the variable valve lifting device 133 located at the exhaust side of the engine 111.

Figure 22A:
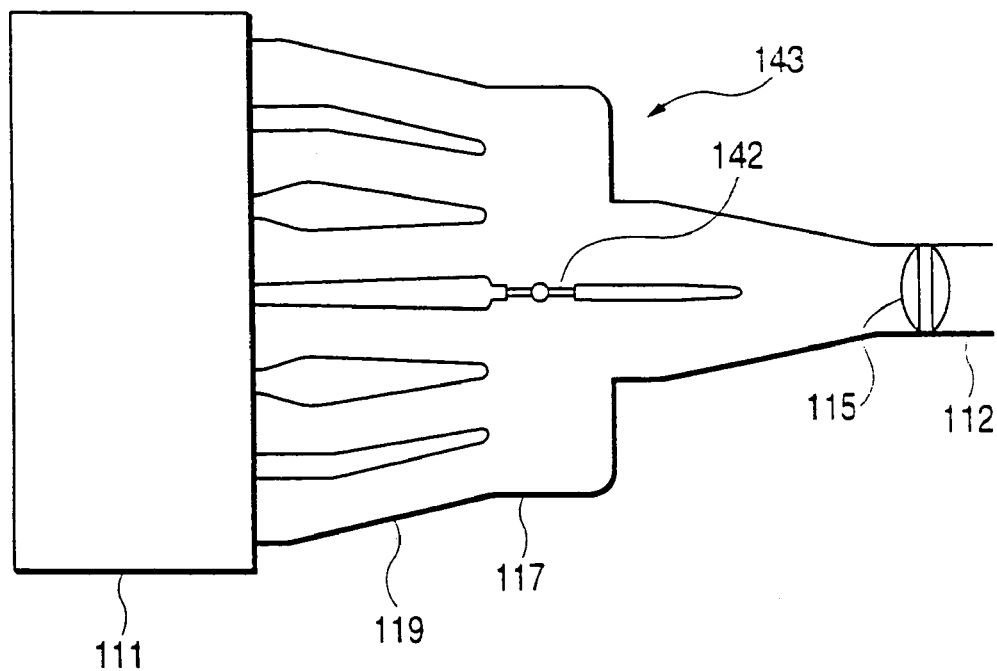
FIGS. 22A and 22B are schematic diagrams showing the overall arrangement of a variable air intake device in accordance with a modified embodiment of the present invention, in which a shutoff valve is closed (FIG. 22A) or opened (FIG. 22B).
Figure 22B:
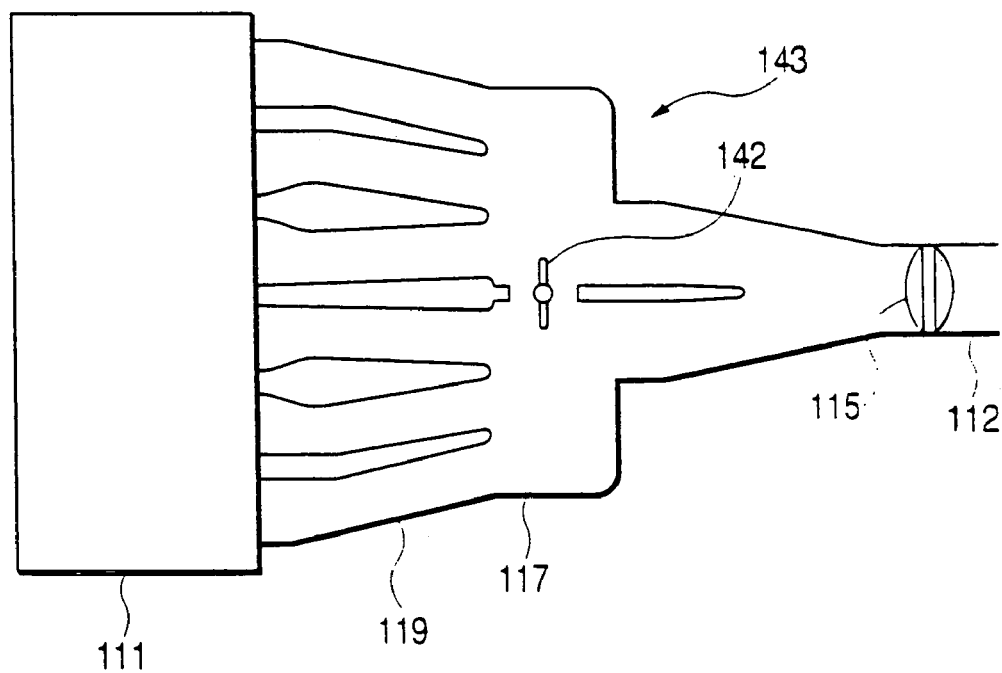

Furthermore, this invention can be applied to the air intake system shown in FIG. 22A and FIG. 22B. According to this air intake system, the intake manifold 119 of each cylinder is connected to the surge tank 117 (i.e. intake air collector) and the inside space of this surge tank 117 is separable by means of a shutoff valve 142 which is open or close controlled so as to constitute variable air intake device 143. According to this system, ECU 127 switches the control mode of the variable air intake device 143 in accordance with engine operating conditions.

More specifically, ECU 127 calculates the output torque of the engine 111, and then learns a torque (hereinafter, referred to as "pre-switching torque") calculated immediately before the control mode of the variable air intake device 143 is switched, and also learns a torque (hereinafter referred to as "post-switching torque") calculated immediately after the control mode is switched. Then, ECU 127 corrects switching characteristics (switching rotational speed, engine load, etc) of the control mode of the variable air intake device 143 based on learning result so as to reduce a difference between the pre-switching torque and the post-switching torque.

Alternatively, it is possible that ECU 127 corrects a specific control parameter at least in a selected control mode when the control mode of the variable air intake device 143 is switched to this selected control mode, based on the learning result so as to reduce (or eliminate) a difference between the pre-switching torque and the post-switching torque.

Alternatively, it is possible to detect information relating to the output torque of the engine 111 (hereinafter, referred to as "torque information"). In this case, ECU 127 learns torque information (hereinafter, referred to as "pre-switching torque information") detected immediately before the control mode of the variable air intake device 143 is switched as well as torque information (hereinafter, referred to as "post-switching torque information") detected immediately after the control mode is switched. Then, ECU 127 corrects a specific control parameter at least in a selected control mode when the control mode of the variable air intake device 143 is switched to this control mode, based on learning result so as to reduce (or eliminate) a difference between the pre-switching torque information and the post-switching torque information.

In this case, it is preferable that ECU 127 corrects all (or at least two of) the ignition timing, the valve timing, and the throttle opening degree as specific control parameters. It is also preferable to correct other parameters (e.g. fuel injection amount, air-flow control valve opening, EGR valve opening degree, etc.) instead of using the ignition timing, the valve timing, and the throttle opening degree.

The variable air intake device of this invention is not limited to the arrangement shown in FIGS. 22A and 22B. For example, the present invention can be applied to a variable air intake device capable of switching the intake pipe length among a plurality patterns, or a variable air intake device capable of switching the intake passage arrangement among a plurality of patterns.

What is claimed is:

1. A control apparatus for an internal combustion engine equipped with a variable valve lifting device which switches lift characteristics of an intake valve and/or an exhaust valve of an internal combustion engine from one of first and second control modes differentiated in said lift characteristics to the other of said control modes, when an operating condition of the internal combustion engine is placed at a first switching level at which a difference in output torque of said internal combustion engine between the first and second control modes is expected to be minimized, said control apparatus comprising:

a torque calculating unit which calculates an output torque of said internal combustion engine for the first or second control mode;

a torque learning unit which learns a torque calculated by said torque calculating unit immediately before switching from the first control mode to the second control mode at the first switching level of the operating condition as a pre-switching torque, and also learning a torque calculated by said torque calculating unit immediately after switching from the first control mode to the second control mode at the first level of the operating condition as a post-switching torque; and an operating condition correcting unit which corrects the first switching level of the operating condition to a second switching level based on the pre-switching torque and the post-switching torque of said torque learning unit so as to reduce a difference in output torque of said internal combustion engine at the second switching level of the operating condition between the first and second control modes as compared with the difference at the first switching level, said variable valve lifting device switching the first and second modes at the second switching level of the operating condition.

2. The control apparatus in accordance with claim 1, wherein the difference in output torque of said internal combustion engine between the first and second control modes is expected to be zero at the first switching level of the operating condition, and the operating condition correcting unit is adapted to correct the first switching level to the second switching level such that the difference in output torque of said internal combustion engine between the first and second control modes becomes equal to zero at the second switching level of the operation condition.

3. The control apparatus in accordance with claim 1, wherein said variable valve lifting device is adapted to switch to one of the first and second modes so as to lift up or down the intake valve and/or the exhaust valve by a first lift amount and is adapted to switch to the other mode so as to lift up or down the intake valve and/or the exhaust valve by a second lift amount larger than the first lift amount.

4. The control apparatus in accordance with claim 1, wherein the operating condition of the internal combustion engine denotes one of an engine rotational speed, and intake pipe pressure, an intake air amount and a throttle opening degree.

5. A control apparatus for an internal combustion engine equipped with a variable air intake device which switches an intake passage condition of an internal combustion engine from one of first and second control modes differentiated in said intake passage condition to the other of said control modes, when an operating condition of the internal combustion engine is placed at a first switching level at which a difference in output torque of said internal combustion engine between the first and second control modes is expected to be minimized, said control apparatus comprising:
 a torque calculating unit which calculates an output torque of said internal combustion engine for the first or second control mode;
 a torque learning unit which learns a torque calculated by said torque calculating unit immediately before switching from the first control mode to the second control mode at the first switching level of the operating condition as a pre-switching torque and also learning a torque calculated by said torque calculating unit immediately after switching from the first control mode to the second control mode at the first switching level of the operating condition as a post-switching torque; and
 an operating condition correcting unit which corrects the first switching level of the operating unit to a second switching level based on the pre-switching torque and the post-switching torque of said torque learning unit so as to reduce a difference in output torque of said combustion engine at the second switching level of the operating condition between the first and second control modes as compared with the difference at the first switching level, said variable air intake device switching the first and second modes at the second switching level of the operation condition.

6. The control apparatus in accordance with claim 5, wherein the difference in output torque of said internal combustion engine between the first and second control modes is expected to be zero at the first switching level of the operating condition, and the operating condition correcting unit is adapted to correct the first switching level to the second switching level such that the difference in output torque of said internal combustion engine between the first and second control modes becomes equal to zero at the second switching level of the operating condition.

7. The control apparatus in accordance with claim 5, wherein said variable air intake device is adapted to switch the first and second modes so as to change an intake pipe length.

8. The control apparatus in accordance with claim 5, wherein the operating condition of the internal combustion engine denotes one of an engine rotational speed, an intake pipe pressure, an intake air amount and a throttle opening degree.

* * * * *